(12) United States Patent
Kindsvatter et al.

(10) Patent No.: US 12,112,389 B2
(45) Date of Patent: Oct. 8, 2024

(54) ASSESSMENT AND PERFORMANCE SYSTEM FOR CONTENT DISTRIBUTION ACROSS MULTIPLE CHANNELS

(71) Applicant: Symphony MediaAI, Greenwood Village, CO (US)

(72) Inventors: Ashley Kindsvatter, Greenwood Village, CO (US); Karin Bleiler, Greenwood Village, CO (US); Katie Stolpa, Greenwood Village, CO (US); Joe Mancini, Greenwood Village, CO (US); Eshwar Belani, Greenwood Village, CO (US); Jagdish Unni, Greenwood Village, CO (US); Sudarson Pratihar, Greenwood Village, CO (US)

(73) Assignee: Cable Audit Associates, LLC, Greenwood Village, CO (US)

( * ) Notice: Subject to any disclaimer, the term of this patent is extended or adjusted under 35 U.S.C. 154(b) by 0 days.

(21) Appl. No.: 17/644,779

(22) Filed: Dec. 16, 2021

(65) Prior Publication Data

US 2022/0188941 A1 Jun. 16, 2022

Related U.S. Application Data

(60) Provisional application No. 63/126,508, filed on Dec. 16, 2020.

(51) Int. Cl.
*G06Q 40/12* (2023.01)
*G06Q 10/0639* (2023.01)

(52) U.S. Cl.
CPC ......... *G06Q 40/12* (2013.12); *G06Q 10/0639* (2013.01)

(58) Field of Classification Search
None
See application file for complete search history.

(56) References Cited

U.S. PATENT DOCUMENTS 6,698,020 B1 * 2/2004 Zigmond ........... H04N 21/4622
725/139
11,206,440 B1 * 12/2021 Macauley .......... H04N 21/2668
(Continued)

OTHER PUBLICATIONS

International Application No. PCT/US2021/063932, International Search Report and the Written Opinion, dated Apr. 18, 2022, 15 pages.

(Continued)

*Primary Examiner* — Fateh M Obaid
(74) *Attorney, Agent, or Firm* — Ahmann Kloke LLP

(57) ABSTRACT

An example method comprises receiving a first and second report from a first and second distribution partner, each partner distributing content of the content owner over a different channel, some of the content being the same content being distributed by the different channels, retrieving revenue information from each report including payments by the distributors to the content owner, determining payment information based on revenue rules and performance information associated with each distributor based on the respective reports, notifying a content owner if the payment information does not match the revenue information, providing a first graphical user interface depicting aggregate value of each title of the first content, the aggregate value being an aggregation of the payment information from the reports, one or more of the plurality of titles of the first content being distributed by both channels.

19 Claims, 19 Drawing Sheets

(56) References Cited

U.S. PATENT DOCUMENTS

| | | | |
|---|---|---|---|
| 2003/0145323 A1* | 7/2003 | Hendricks | H04N 21/2389 |
| | | | 348/E5.103 |
| 2009/0083279 A1* | 3/2009 | Hasek | H04N 21/21815 |
| 2012/0036053 A1 | 2/2012 | Miller | |
| 2013/0238474 A1 | 9/2013 | Nagel | |
| 2013/0276022 A1* | 10/2013 | Tidwell | G06Q 30/0241 |
| | | | 725/34 |
| 2014/0325547 A1 | 10/2014 | Roberts et al. | |
| 2015/0143395 A1* | 5/2015 | Reisman | H04N 21/4358 |
| | | | 725/14 |
| 2017/0011774 A1* | 1/2017 | Ju | G11B 27/28 |
| 2017/0365295 A1* | 12/2017 | Clem | H04N 21/8543 |
| 2018/0035142 A1* | 2/2018 | Rao | H04N 21/4667 |
| 2018/0332338 A1* | 11/2018 | Hardee | H04N 21/6405 |
| 2021/0266234 A1* | 8/2021 | Barnett, Jr. | H04L 47/765 |
| 2022/0030300 A1* | 1/2022 | Periyaeluvan | H04N 21/44231 |

OTHER PUBLICATIONS

European Patent application No. 21907857.3, Extended European Search Report dated Jun. 4, 2024, 12 pages.

* cited by examiner

ⁿᵒʲ MEDIA.ai    DASHBOARD   PAYMENTS   DISTRIBUTORS   CONTENT   REPORTS    🔍 ⊕ ⊞ ⊗

HOME > DASHBOARD

DASHBOARD — 302

REVENUE - LAST MONTH ($)
49.4 M
↓ -7.0

OF NEW DISTRIBUTORS — 304
15
↑ +2.4

OF NEW TITLES — 306
149
↓ -7.6

OF NEW REPORTS — 308
05
↑ +2.4

TRANSACTION REVENUE - PROJECTIONS    VIEW MORE

| DISTRIBUTOR | # OF TITLES | LAST MONTH PAID ($) | PROJECTED REVENUE ($) | % CHANGE |
|---|---|---|---|---|
| ROKU TV | 2 | 49,300,000 | 47,833,333 | ↓ -2.97% |
| PLUTO TV | 3 | 52,500,390 | 54,560,900 | ↑ +3.92% |
| PRIME TV | 5 | 32,300,390 | 33,200,508 | ↑ +2.97% |
| APPLE TV | 5 | 59,600,300 | 57,660,000 | ↓ -3.26% |
| POGO NETWORK | 6 | 48,500,900 | 47,260,312 | ↓ -2.56% |

— 312

VIEWING BEHAVIOUR - PROJECTIONS    VIEW MORE

| DISTRIBUTOR | # OF TITLES | MINS. WATCHED | PROJECTED VIEW MINS | % CHANGE |
|---|---|---|---|---|
| ROKU TV | 2 | 247,480 | 247,480 | ↓ -2.97% |
| PLUTO TV | 3 | 245,297 | 245,297 | ↑ +3.92% |
| PRIME TV | 5 | 173,863 | 173,863 | ↑ +2.97% |
| APPLE TV | 5 | 3,002,914 | 3,002,914 | ↓ -3.26% |
| POGO NETWORK | 6 | 3,000,115 | 3,000,115 | ↓ -2.56% |

UPCOMING PROMOTIONS    VIEW MORE

| PROMO DESCRIPTION | TITLE CATEGORY | START DATE | END DATE | DISCOUNT |
|---|---|---|---|---|

TITLE LAUNCHES WITH AVAILS    VIEW MORE

| TITLE NAME | ACTUAL COST ($) | OFFER COST ($) | OFFER TYPE | AVAIL DATE |
|---|---|---|---|---|

— 310

FIG. 3 noj MEDIAAi | DASHBOARD  PAYMENTS  DISTRIBUTORS  CONTENT  REPORTS

HOME > CONFIGURATION > DASHBOARD SETTINGS

CONFIGURATION DETAILS

DASHBOARD SETTINGS  NOTIFICATION SETTINGS  DISTRIBUTORS CONFIGURATION  PROFILE SETTINGS

| BOX VIEW | |
|---|---|
| NAME | ACTION |
| ▪ LAST MONTH REVENUE | ⊙ |
| ▪ # OF NEW DISTRIBUTORS | ⊙ |
| ▪ # OF NEW TITLES | ⊙ |
| ▪ # OF NEW SERIES | ⊙ |
| ▪ TOTAL DISTRIBUTORS | ⊙ |
| ▪ TOTAL TITLES | ⊙ |
| ▪ TOTAL SERIES | ⊙ |

| TABLE VIEW | |
|---|---|
| NAME | ACTION |
| ▪ TRANSACTION REVENUE - PROJECTIONS | ⊙ |
| ▪ VIEWING BEHAVIOUR - PROJECTIONS | ⊙ |
| ▪ UPCOMING PROMOTIONS | ⊙ |
| ▪ TITLE LAUNCHES WITH AVAILS | ⊙ |

FIG. 6

FIG. 7 nqj MEDIA.ai | DASHBOARD | PAYMENTS | DISTRIBUTORS | CONTENT | REPORTS

HOME > CONFIGURATION > DISTRIBUTORS CONFIGURATION

CONFIGURATION DETAILS

DASHBOARD SETTINGS | NOTIFICATION SETTINGS | DISTRIBUTORS CONFIGURATION | PROFILE SETTINGS

[ + CONFIGURE DISTRIBUTOR ]

---

CONFIGURE DISTRIBUTOR COLUMNS ⊗

DISTRIBUTOR NAME *
[ PLUTO TV ▼ ]

PREDEFINED FIELD NAMES

| FIELD NAMES | COLUMN MAPPING |
|---|---|
| ⊙ DATE | [ DATE (MM/DD/YYYY) ] |
| ⊙ SERIES ID | [ S_ID ] |
| ⊙ SERIES NAME | [ S_NAME ] |
| ⊙ TITLE ID | [ T_ID ] |
| ⊙ TITLE NAME | [ T_NAME ] |
| ⊙ MINUTES STREAMED | [ MIN_STREAMED ] |
| ⊙ UNIQUE VIEWS | [ UNIQUE_VIEWS ] |
| ⊙ REGION | [ REGION ] |
| ⊙ CURRENCY | [ CURRENCY ] |
| ⊙ GROSS REVENUE(S) | [ GROSS_REV ] |
| ○ NET REVENUE | [ NET_REV ] |

( CANCEL ) ( SAVE )

— 700 noù MEDIA.ai  DASHBOARD  PAYMENTS  DISTRIBUTORS  CONTENT  REPORTS

HOME>CONTENTS>TITLE DETAILS

CONTENT DETAILS

TITLES    SERIES

| STATUS | | | | | | | | Q SEARCH | | | | | EXPORT | +ADD TITLE |
|---|---|---|---|---|---|---|---|---|---|---|---|---|---|---|
| TITLE NAME | TITLE ID | SERIES NAME | SERIES ID | GENRE | OPEN TERRITORIES | CLOSED TERRITORIES | RIGHTS HOLDER | AVAIL DATE | END DATE | STATUS | ASSIGN | ACTION |
| △ FANTASY ISLAND | T-500011 | | | MYSTERY | MULTIPLE | MULTIPLE | BLUMHOUSE | 01/01/2020 | 30/06/2020 | ACTIVE | ⊕ | ••• |
| △ THE CALL OF THE WILD | T-500012 | | | ADVENTURE | MULTIPLE | MULTIPLE | 3 ARTS | 01/01/2020 | 30/06/2020 | ACTIVE | ⊕ | ••• |
| ▽ TROLLS WORLD TOUR | T-500013 | | | MUSICAL | MULTIPLE | MULTIPLE | DREAMWORKS | 01/01/2020 | 30/06/2020 | ACTIVE | ⊕ | ••• |

| DISTRIBUTOR ID | DISTRIBUTOR NAME | DISTRIBUTOR TITLE ID | DISTRIBUTOR TITLE NAME | ACTION |
|---|---|---|---|---|
| D-500001 | ROKU | D-TI-500001 | TROLLS WORLD TOUR - HD | ••• |
| D-500002 | PLUTO TV | D-TI-500002 | TROLLS WORLD TOUR - UHD | ••• |

FIG. 8

| nOj MEDIA.ai | DASHBOARD | PAYMENTS | DISTRIBUTORS | CONTENT | REPORTS | | 🔍 @ ⚙ ⊗ |

HOME > DISTRIBUTORS

LIST OF DISTRIBUTORS

🔍 SEARCH

STATUS ▾

EXPORT    (+ ADD DISTRIBUTOR)

| DISTRIBUTOR NAME | DISTRIBUTOR ID | # OF ACTIVE SERIES | # OF ACTIVE TITLES | START DATE | END DATE | STATUS | ACTION |
|---|---|---|---|---|---|---|---|
| ROKU TV | D-500061 | 250 | 10 | 01/2020 | 12/2021 | ACTIVE | ... |
| PLUTO TV | D-500062 | 250 | 10 | 01/2020 | 12/2021 | ACTIVE | ... |
| XUMO | D-500063 | 250 | 10 | 01/2020 | 12/2021 | ACTIVE | ... |
| TUBI TV | D-500064 | 250 | 10 | 01/2020 | 12/2021 | ACTIVE | ... |
| PRIME TV | D-500065 | 250 | 10 | 01/2020 | 12/2021 | ACTIVE | ... |
| APPLE TV | D-500066 | 250 | 10 | 01/2020 | 12/2021 | ACTIVE | ... |

FIG. 9 noj MEDIAAI  DASHBOARD  PAYMENTS  DISTRIBUTORS  CONTENT  REPORTS

HOME > DISTRIBUTORS > DISTRIBUTOR DETAILS

DISTRIBUTOR DETAILS

BACK TO DISTRIBUTORS LIST

| DISTRIBUTOR NAME | DISTRIBUTOR ID | # OF SERIES | # OF TITLES | # OF ACTIVE SERIES | # OF ACTIVE TITLES | START DATE | END DATE |
|---|---|---|---|---|---|---|---|
| PLUTO TV | D-500062 | 250 | 10 | 250 | 10 | 01/2020 | 12/2021 |

LIST OF SERIES & TITLES

🔍 SEARCH

| SERIES | TITLES | START DATE | END DATE | STATUS |
|---|---|---|---|---|
| GAME OF THRONES | EPISODE 1 | 01/2020 | 12/2021 | ACTIVE |
| GAME OF THRONES | EPISODE 2 | 01/2020 | 12/2021 | ACTIVE |
| GAME OF THRONES | EPISODE 3 | 01/2020 | 12/2021 | ACTIVE |
| BREAKING BAD | EPISODE 1 | 01/2020 | 12/2021 | ACTIVE |
| BREAKING BAD | EPISODE 2 | 01/2020 | 12/2021 | ACTIVE |

FIG. 10

PAYMENT DETAILS

HOME > PAYMENTS > PAYMENT DETAILS

PAYMENT DETAILS

| DISTRIBUTOR NAME | # OF ACTIVE SERIES | # OF ACTIVE TITLES | MINUTES STREAMED | GROSS REVENUE($) | NET REVENUE($) |
|---|---|---|---|---|---|
| ROKU TV | 120 | 1500 | 55000 | 255000 | 255000 |
| PLUTO TV | 100 | 1000 | 45000 | 245000 | 245000 |
| XUMO | 120 | 1500 | 55000 | 255000 | 255000 |
| TUBI TV | 100 | 1000 | 45000 | 245000 | 245000 |
| PRIME TV | 120 | 1500 | 55000 | 255000 | 255000 |
| APPLE TV | 100 | 1000 | 45000 | 245000 | 245000 |

FIG. 12

REPORT DETAILS

| FROM | TO | DISTRIBUTOR | SERIES | TITLE | |
|---|---|---|---|---|---|
| 01/2020 | 12/2021 | PLUTO TV | MULTIPLE | MULTIPLE | GENERATE REPORT |

LIST OF REPORTS

🔍 SEARCH

| START DATE | END DATE | DISTRIBUTORS | SERIES NAME | TITLE NAME | PROJECTED($) | PROJECTED SUB($) | ACTION |
|---|---|---|---|---|---|---|---|
| 01/2020 | 12/2021 | PLUTO TV | MULTIPLE | MULTIPLE | 12500213132 | 12500213132 | DOWNLOAD |
| 01/2020 | 12/2021 | MULTIPLE | MULTIPLE | MULTIPLE | 12500213132 | 12500213132 | GENERATING... |
| 01/2020 | 12/2021 | MULTIPLE | MULTIPLE | MULTIPLE | 12500213132 | 12500213132 | DOWNLOAD |
| 01/2020 | 12/2021 | PLUTO TV | MULTIPLE | MULTIPLE | 12500213132 | 12500213132 | DOWNLOAD |
| 01/2020 | 12/2021 | MULTIPLE | MULTIPLE | MULTIPLE | 12500213132 | 12500213132 | DOWNLOAD |
| 01/2020 | 12/2021 | PLUTO TV | GAME OF THRONES | S1 & EPISODE 1 | 12500213132 | 12500213132 | DOWNLOAD |

| Marketplace | Country/Region Code | Invoice ID | Transaction ID | Transaction Time |
|---|---|---|---|---|
| Market.co.uk | GB | a52bc3df9 26f8543adcb8c48c7983cd60f32a2f0 | 2.92E61E+11 | 2020-08-01 20:58:38 BST |
| Market.com | US | 524a121e49d64e0c3bf7a49dc34207302d86eb91 | 2.38952E+12 | 2020-08-01 18:41:49 PDT |
| Market.com | US | 524a121e49d64e0c3bf7a49dc34207302d86eb91 | 2.38954E+12 | 2020-08-01 18:32:36 PDT |
| Market.com | US | 524a121e49d64e0c3bf7a49dc34207302d86eb91 | 2.38954E+12 | 2020-08-01 17:49:09 PDT |
| Market.ca | CA | 0028bd2af49a5e3489032fd46f762910 1d3e52cf | 2.06338E+13 | 2020-07-31 23:55:15 EDT |
| Market.ca | CA | 0028bd2af49a5e3489032fd46f762910 1d3e52cf | 2.06333E+13 | 2020-07-31 23:51:38 EDT |

| Transaction Type | Adjustment (Yes / No) | ID1 | Title | Item Name | Item Type | In-App Subscription Term | In-App Subscription Status |
|---|---|---|---|---|---|---|---|
| Refund | No | B06Y4B0JR2 | Subscription 1 | Monthly Membership | Subscription | Monthly | PAID |
| Refund | No | B0716DLM3P | Subscription 1 | Monthly Membership | Subscription | Monthly | PAID |
| Refund | No | B06Y4F2XKT | Subscription 1 | Annual Membership | Subscription | Annually | PAID |
| Refund | No | B0716DLM3P | Subscription 1 | Monthly Membership | Subscription | Monthly | PAID |
| Charge | No | B07F3HS5DL | Subscription 1 | Monthly subscription 1 | Subscription | Monthly | TRIAL |
| Charge | No | B06Y4BGK2V | Subscription 1 | Subscription 1 | Application | | |

| Units | Usage Time for Underground Apps | Marketplace Currency | Sales Price (Marketplace) | Estimated Earnings (Marketplace) |
|---|---|---|---|---|
| 1 | | GBP | 4.16 | -3.54 |
| 1 | | USD | 5.99 | -5.09 |
| 1 | | USD | 56.99 | -48.44 |
| 1 | | USD | 5.99 | -5.09 |
| 1 | | CAD | 0 | 0 |
| 1 | | CAD | 0 | 0 |

FIG. 15

| Provider | Provider Country | SKU | Developer | Title | Version | Product Type Identifier | Units |
|---|---|---|---|---|---|---|---|
| PROVIDER | US | sample.member.annual | | Sample TV Membership_600_365 | | IAY | -1 |
| PROVIDER | US | sample.member.annual7dt | | Sample 7DT Membership_600_365 | | IAY | -1 |
| PROVIDER | US | sample.member.annual7dt | | Sample 7DT Membership_600_365 | | IAY | -2 |
| PROVIDER | US | sample.member.annual | | Sample Membership_600_365 | | IAY | -1 |
| PROVIDER | US | sample.member.month | | Sample Membership_200_30 | | IAY | -1 |
| PROVIDER | US | sample.member.month | | Sample Membership_200_30 | | IAY | -1 |
| PROVIDER | US | sample.member.annual7dt | | Sample 7DT Membership_600_365 | | IAY | -1 |
| PROVIDER | US | sample.member.annual | | Sample Membership_600_365 | | IAY | -4 |
| PROVIDER | US | sample.member.annual | | Sample Membership_600_365 | | IAY | -1 |
| PROVIDER | US | sample.member.annual7dt | | Sample 7DT Membership_600_365 | | IAY | -1 |

| Developer Proceeds | Begin Date | End Date | Customer Currency | Customer Country Code | Currency of Proceeds | Distributor Identifier | Customer Price | Promo Code |
|---|---|---|---|---|---|---|---|---|
| 27000 | 10/1/2020 | 10/31/2020 | CLP | CL | CLP | 1063912145 | (45,900.00) | |
| 559.3 | 10/1/2020 | 10/31/2020 | MXN | MX | MXN | 1169749708 | (799.00) | |
| 76.49 | 10/1/2020 | 10/31/2020 | CAD | CA | CAD | 1169749708 | (89.99) | |
| 76.49 | 10/1/2020 | 10/31/2020 | CAD | CA | CAD | 1063912145 | (89.99) | |
| 48.69 | 10/1/2020 | 10/31/2020 | ZAR | ZA | ZAR | 1063912144 | (79.99) | |
| 47.67 | 10/1/2020 | 10/31/2020 | MXN | MX | MXN | 1063912144 | (79.00) | |
| 49 | 10/1/2020 | 10/31/2020 | USD | US | USD | 1063912145 | (69.99) | |
| 59.49 | 10/1/2020 | 10/31/2020 | USD | US | USD | 1169749708 | (69.99) | |
| 49 | 10/1/2020 | 10/31/2020 | USD | US | USD | 1063912145 | (69.99) | |
| 59.49 | 10/1/2020 | 10/31/2020 | USD | US | USD | 1063912145 | (69.99) | |
| 49 | 10/1/2020 | 10/31/2020 | USD | US | USD | 1169749708 | (69.99) | |

FIG. 16a

| Parent Identifier | Subscription | Period | Category | CMB | Device | Supported platforms | Proceeds Reason | Preserved Pricing |
|---|---|---|---|---|---|---|---|---|
| sampletv | Renewal | 1 Year | Entertainment | | Desktop | iOS and tvOS | | |
| sampletv | New | 1 Year | Entertainment | | iPhone | iOS and tvOS | | |
| sampletv | Renewal | 1 Year | Entertainment | | iPad | iOS and tvOS | Rate After One Y | |
| sampletv | Renewal | 1 Year | Entertainment | | iPhone | iOS and tvOS | Rate After One Y | |
| sampletv | Renewal | 1 Month | Entertainment | | iPhone | iOS and tvOS | | |
| sampletv | Renewal | 1 Month | Entertainment | | iPhone | iOS and tvOS | | |
| sampletv | Renewal | 1 Year | Entertainment | | Apple TV | iOS and tvOS | Rate After One Y | |
| sampletv | Renewal | 1 Year | Entertainment | | Apple TV | iOS and tvOS | | |
| sampletv | Renewal | 1 Year | Entertainment | | iPhone | iOS and tvOS | Rate After One Y | |
| sampletv | Renewal | 1 Year | Entertainment | | iPhone | iOS and tvOS | | |

| Content Partner Name | Series Name | Clip Name | Tvms | Sessions | Revenue per Clip |
|---|---|---|---|---|---|
| Content Provider | The First Series | The First Series: Episode 1 (S1E1) | 242,713 | 8,211 | $ 1,000.24 |
| Content Provider | The First Series | The First Series: Episode 2 (S1E2) | 130,725 | 4,393 | $ 997.38 |
| Content Provider | The First Series | The First Series: Episode 3 (S1E3) | 233,259 | 7,430 | $ 909.22 |
| Content Provider | The First Series | The Second Series: Episode 4 (S1E4) | 128,824 | 4,514 | $ 837.98 |
| Content Provider | The Second Series | The Second Series: Episode 1 (S1E1) | 131,498 | 4,771 | $ 825.14 |
| Content Provider | The Second Series | The Second Series: Episode 2 (S1E2) | 214,959 | 7,732 | $ 814.71 |
| Content Provider | The Second Series | The Second Series: Episode 3 (S1E3) | 152,827 | 5,258 | $ 767.60 |
| Content Provider | The Second Series | The Second Series: Episode 4 (S1E4) | 63,377 | 2,631 | $ 736.69 |

1750

| Date | Channel Name | Content Id | Content Name | Device Type | Country | Session Count | Total Viewership | Unique Viewers | Avg Session | Avg Session |
|---|---|---|---|---|---|---|---|---|---|---|
| 4/2/2021 | channel_smarttv | FS32305 | Workout | Smart TV | United St | 53 | 184 | 51 | 1.04 | 3.47 |
| 4/16/2021 | channel_smarttv | FS32305 | Workout | Smart TV | United St | 58 | 388 | 56 | 1.04 | 6.69 |
| 4/20/2021 | channel_smarttv | FS32305 | Workout | Smart TV | United St | 25 | 171 | 25 | 1 | 6.84 |
| 4/26/2021 | channel_smarttv | FS32305 | Workout | Smart TV | United St | 11 | 65 | 11 | 1 | 5.91 |
| 4/27/2021 | channel_smarttv | FS32305 | Workout | Smart TV | United St | 35 | 156 | 35 | 1 | 4.46 |

FIG. 17

ASSESSMENT AND PERFORMANCE SYSTEM FOR CONTENT DISTRIBUTION ACROSS MULTIPLE CHANNELS

CROSS-REFERENCE TO RELATED APPLICATIONS

This application claims priority to U.S. Provisional Patent Application No. 63/126,508, filed on Dec. 16, 2020, and entitled "SYSTEMS AND METHODS FOR ANALYTICS AND INSIGHT," which is incorporated herein by reference in its entirety.

FIELD OF THE INVENTION

Embodiments of the present invention(s) relate generally to architecture for tracking performance and return on different distribution partners using different distribution channels for content and, in particular, a centralized architecture for scalable, tracking return and performance for content of different content owners across distribution partner activities.

BACKGROUND

As the number of distribution partners and different service channels proliferate, the process of determining return and performance of content across different partners and service channels has become increasingly difficult. Technology has provided many options to consume content including, for example, subscription services, content rental, content license, advertising supported (but otherwise "free") content, bundled fees content, and the like. As a consequence, the number, complexity, and models of agreements for different distribution partners for a single content owner has dramatically increased. As follows, the technology has provided many opportunities to obtain return and performance metrics, but the different channels require different return models and different performance models.

When a distribution partner system distributes a content owner's particular content, the distribution partner may provide periodic reports back to the content owner. The report may indicate each title's performance (e.g., consumption) that the distribution partner has rights to distribute over a time frame. The report may indicate return information and performance information regarding availability and consumption of different content. Some reports may include compensation for subscription services that provide the content, advertising revenue, direct purchase, licensing, rental, and the like.

As the number of different channels and approaches for content consumption increases, the number of reports, amount of data, and complexity of the deals increase. For example, content is not limited to traditional broadcast means but rather may be distributed over an increasing number of different subscription channels (each with their own markets), pay per view channels, advertising-supported applications (e.g., on a smart device), consumer renting, consumer purchasing, and/or limited time exclusivity to name only a few (i.e., complexities caused by new technology). As the number of views of the content increases, different distribution partners may pay increased compensation. Further reports from the different distribution partners are differently formatted, contain different information, and are often difficult to navigate (e.g., some reports change the title names so that the content owner must reconcile the performance data by determining which record is associated with which title). In some cases, the same distribution partner may provide differently formatted reports for different content (e.g., depending on different distribution channels supported by the distribution partner).

Historically, each content owner would manually review the reports, track the criteria for compensation, and confirm performance and compensation. If the report includes an error, the content owner typically identifies shortfalls based on the report and receive additional compensation from the distribution partner system. Because of the manual review, (e.g., with an employee reviewing the report and comparing the reported metrics to agreement criteria between that particular content owner and the particular distribution partner that provided the report), the process is exhausting, prone to error, and slow. As the number of channels increase for distribution and the content requires different criteria for compensation, the difficulty and complexity and confirming compensation, performance, and revenue is increasingly difficult. Similarly determining performance for single distribution partner is increasingly difficult and often comparing performance for the same content across multiple distribution partners is often impractical if not impossible to achieve.

SUMMARY

An example system comprises one or more processors and memory containing instructions configured to control the one or more processors to: receive a first distribution report from a first distribution partner and a second distribution report from a second partner, the first distribution partner providing distribution of a first content owner's content to consumers over a first OTT distribution channel, the second distribution partner providing distribution of the first content owner's content over a second OTT distribution channel, the distribution partners being independent of each other, the first distribution partner and the second distribution partner distributing at least some of a same content of the first content owner's content to different consumers, the first OTT distribution channel being different than the second OTT distribution channel, the first distribution report indicating performance information including consumer consumption of the first content owner's content provided over the first OTT distribution channel and first revenue information related to distribution of the first content owner's content, the second distribution report indicating performance information including consumer consumption of the first content owner's content provided over the second OTT distribution channel and revenue information related to the first content owner's content, retrieve first revenue information from the first distribution report, the first revenue information indicating first payments from the first distribution partner to a first content owner in exchange for content distribution, determine first payment information based on first revenue rules and the first performance information from the first distribution report, the first performance information indicating consumption of the first content owner's content using the first OTT distribution channel, the first payment information indicating payment earned by the first content owner based on the first revenue rules, the first revenue rules indicating criteria of compensation between the content owner and the first distribution partner, notify a first content owner system of the first content owner if the first payment information does not match the first revenue information, retrieve second revenue information from the second distribution report, the second revenue information indicating second payments from the second distribution partner to the first content owner in exchange for content distribution, determine second payment information based on second revenue rules and the second performance information from the second distribution report, the second performance information indicating consumption of the first content owner's content using the second OTT distribution channel, the second payment information indicating payment earned by the first content owner based on the second revenue rules, the second revenue rules indicating criteria of compensation between the content owner and the second distribution partner, notify a first content owner system of the first content owner if the second payment information does not match the second revenue information, and provide a first graphical user interface depicting first aggregate value of each title of a plurality of titles of the first content, the aggregate value being an aggregation of the first payment information from the first distribution report and the second payment information from the second distribution report, one or more of the plurality of titles of the first content being distributed by both the first OTT distribution channel and the second OTT distribution channel, the first graphical user interface further configured to display the first payment information and the first revenue information associated with the first distribution partner, first performance information associated with the first distribution partner, the second payment information and the second revenue information associated with the second distribution partner, second performance information associated with the second distribution partner.

The memory containing instructions configured to control the one or more processors may further retrieve a first report template, the first report template indicating locations of the first revenue information from two or more locations within the first distribution report, wherein retrieve first revenue information from the first distribution report comprises the instructions configured to control the one or more processors to utilize the first report template to retrieve the first revenue information. In some embodiments, the memory containing instructions configured to control the one or more processors to further retrieve third revenue information from a third distribution report, the third revenue information indicating third payments from a third distribution partner to the first content owner in exchange for content distribution over an OTA channel, determine third payment information based on third revenue rules and third performance information from the third distribution report, the third performance information indicating consumption of the first content owner's content using the OTA distribution channel, the third payment information indicating payment earned by the first content owner based on the third revenue rules, the third revenue rules indicating criteria of compensation between the first content owner and the third distribution partner, and notify the first content owner system of the first content owner if the third payment information does not match the second revenue information, and wherein the first aggregate value of each title or a plurality of titles of the first content is the aggregation of the first payment information from the first distribution report, the second payment information from the second distribution report, and the third payment information from the third distribution report.

In various embodiments, the memory containing instructions configured to control the one or more processors to further retrieve fourth revenue information from a fourth distribution report, the fourth revenue information indicating fourth payments from a fourth distribution partner to a second content owner in exchange for content distribution over a fourth OTT channel by the fourth distribution partner, determine fourth payment information based on fourth revenue rules and fourth performance information from the fourth distribution report, the fourth performance information indicating consumption of the second content owner's content using the fourth OTT distribution channel, the fourth payment information indicating payment earned by the second content owner based on the fourth revenue rules, the fourth revenue rules indicating criteria of compensation between the second content owner and the fourth distribution partner, and notify the second content owner system of the second content owner if the fourth payment information does not match the fourth revenue information, and provide a second graphical user interface for access by the second content owner to display the fourth payment information and the fourth revenue information associated with the fourth distribution partner.

In one example, the fourth OTT channel and the first OTT channel utilize a distribution methodology, whereby the first report template is used to indicate locations of the fourth revenue information from two or more locations within the fourth distribution report, wherein retrieve fourth revenue information from the fourth distribution report comprises the instructions configured to control the one or more processors to utilize the first report template to retrieve the fourth revenue information.

In some embodiments, the first OTT channel is an SVOD channel and the second OTT channel is a FAST channel. Further, in some embodiments, the first revenue information tracks compensation based on advertisement revenue associated with consumption of the first content and second revenue information tracks compensation based on subscription revenue.

In some embodiments, the memory containing instructions configured to control the one or more processors to further perform language recognition on the first distribution report, recognize headers within the first distribution report to identify locations of metrics, and generate the first template using the locations.

The first graphical user interface may further indicate historical performance and payments of the first distribution partner related to the first content compared to the historical performance and payments of the second distribution partner related to the first content.

An example method comprises receiving a first distribution report from a first distribution partner and a second distribution report from a second partner, the first distribution partner providing distribution of a first content owner's content to consumers over a first OTT distribution channel, the second distribution partner providing distribution of the first content owner's content over a second OTT distribution channel, the distribution partners being independent of each other, the first distribution partner and the second distribution partner distributing at least some of a same content of the first content owner's content to different consumers, the first OTT distribution channel being different than the second OTT distribution channel, the first distribution report indicating performance information including consumer consumption of the first content owner's content provided over the first OTT distribution channel and first revenue information related to distribution of the first content owner's content, the second distribution report indicating performance information including consumer consumption of the first content owner's content provided over the second OTT distribution channel and revenue information related to the first content owner's content, retrieving first revenue information from the first distribution report, the first revenue information indicating first payments from the first distribution partner to a first content owner in exchange for content distribution, determining first payment information based on first revenue rules and the first performance information from the first distribution report, the first performance information indicating consumption of the first content owner's content using the first OTT distribution channel, the first payment information indicating payment earned by the first content owner based on the first revenue rules, the first revenue rules indicating criteria of compensation between the content owner and the first distribution partner, notifying a first content owner system of the first content owner if the first payment information does not match the first revenue information, retrieving second revenue information from the second distribution report, the second revenue information indicating second payments from the second distribution partner to the first content owner in exchange for content distribution, determining second payment information based on second revenue rules and the second performance information from the second distribution report, the second performance information indicating consumption of the first content owner's content using the second OTT distribution channel, the second payment information indicating payment earned by the first content owner based on the second revenue rules, the second revenue rules indicating criteria of compensation between the content owner and the second distribution partner, notifying a first content owner system of the first content owner if the second payment information does not match the second revenue information, and providing a first graphical user interface depicting first aggregate value of each title of a plurality of titles of the first content, the aggregate value being an aggregation of the first payment information from the first distribution report and the second payment information from the second distribution report, one or more of the plurality of titles of the first content being distributed by both the first OTT distribution channel and the second OTT distribution channel, the first graphical user interface further configured to display the first payment information and the first revenue information associated with the first distribution partner, first performance information associated with the first distribution partner, the second payment information and the second revenue information associated with the second distribution partner, second performance information associated with the second distribution partner.

An example computer program product may comprise a non-transitory computer readable storage medium having a program. The program code may be executable by a computing system to cause the computing system to perform a method. The method may comprise receiving a first distribution report from a first distribution partner and a second distribution report from a second partner, the first distribution partner providing distribution of a first content owner's content to consumers over a first OTT distribution channel, the second distribution partner providing distribution of the first content owner's content over a second OTT distribution channel, the distribution partners being independent of each other, the first distribution partner and the second distribution partner distributing at least some of a same content of the first content owner's content to different consumers, the first OTT distribution channel being different than the second OTT distribution channel, the first distribution report indicating performance information including consumer consumption of the first content owner's content provided over the first OTT distribution channel and first revenue information related to distribution of the first content owner's content, the second distribution report indicating performance information including consumer consumption of the first content owner's content provided over the second OTT distribution channel and revenue information related to the first content owner's content, retrieving first revenue information from the first distribution report, the first revenue information indicating first payments from the first distribution partner to a first content owner in exchange for content distribution, determining first payment information based on first revenue rules and the first performance information from the first distribution report, the first performance information indicating consumption of the first content owner's content using the first OTT distribution channel, the first payment information indicating payment earned by the first content owner based on the first revenue rules, the first revenue rules indicating criteria of compensation between the content owner and the first distribution partner, notifying a first content owner system of the first content owner if the first payment information does not match the first revenue information, retrieving second revenue information from the second distribution report, the second revenue information indicating second payments from the second distribution partner to the first content owner in exchange for content distribution, determining second payment information based on second revenue rules and the second performance information from the second distribution report, the second performance information indicating consumption of the first content owner's content using the second OTT distribution channel, the second payment information indicating payment earned by the first content owner based on the second revenue rules, the second revenue rules indicating criteria of compensation between the content owner and the second distribution partner, notifying a first content owner system of the first content owner if the second payment information does not match the second revenue information, and providing a first graphical user interface depicting first aggregate value of each title of a plurality of titles of the first content, the aggregate value being an aggregation of the first payment information from the first distribution report and the second payment information from the second distribution report, one or more of the plurality of titles of the first content being distributed by both the first OTT distribution channel and the second OTT distribution channel, the first graphical user interface further configured to display the first payment information and the first revenue information associated with the first distribution partner, first performance information associated with the first distribution partner, the second payment information and the second revenue information associated with the second distribution partner, second performance information associated with the second distribution partner.

BRIEF DESCRIPTION OF THE DRAWINGS

FIG. 3 depicts a dashboard graphical user interface in some embodiments.

FIG. 6 depicts a settings graphical user interface in some embodiments.

FIG. 7 depicts a distribution configuration settings graphical user interface for changing settings of the distribution configuration in some embodiments.

FIG. 8 depicts a content graphical user interface in some embodiments.

FIG. 9 depicts a distributors graphical user interface in some embodiments.

FIG. 10 depicts a distributors graphical user interface in some embodiments.

FIG. 12 depicts a payments detail dashboard graphical user interface in some embodiments.

FIG. 14 depicts a report dashboard graphical user interface in some embodiments.

FIG. 15 depicts an example distribution report in some embodiments.

FIGS. 16a and 16b depict an example distribution report in some embodiments.

FIG. 17 depicts distribution reports for different AVOD services in some embodiments.

DETAILED DESCRIPTION

Various embodiments depict a centralized system for determining criteria for revenue, compensation, and performance for any number of separate and independent content owners. The content owners own different content (e.g., movies, video series, audio, audio series, and the like). Content owners may contract with one or more different distribution partners to distribute content to consumers. Different distribution partners may distribute the same or different content using similar or different means. For example, one or more distribution partners may distribute a movie and/or a TV series owned by a particular content owner over traditional media (e.g., cable or broadcast TV). Another distribution partner may distribute the same movie and/or TV series using OTT channels (e.g., streaming over a subscription and/or advertisement-supported service).

Different content owners may distribute one or more different titles (e.g., different content files) using any number of distribution partners. Terms for compensation, expectation for performance, milestones, and the like may be different for a content owner and different distribution partners. For that matter, the same content owner may have different terms for compensation, revenue, and third-party royalties with the same distribution partner but covering different content (e.g., a particular blockbuster movie may have different terms than a three-year old series).

It will be appreciated that each title (e.g., non-serial content or episodes of a series) may be valued differently based on consumer excitement, advertising, franchise (e.g., Marvel or Keanu Reeves film), exclusivity, particular channel, length of time the distribution partner has rights, and/or the like. As such, each title may be distributed and/or compensation calculated differently.

Figure 1:
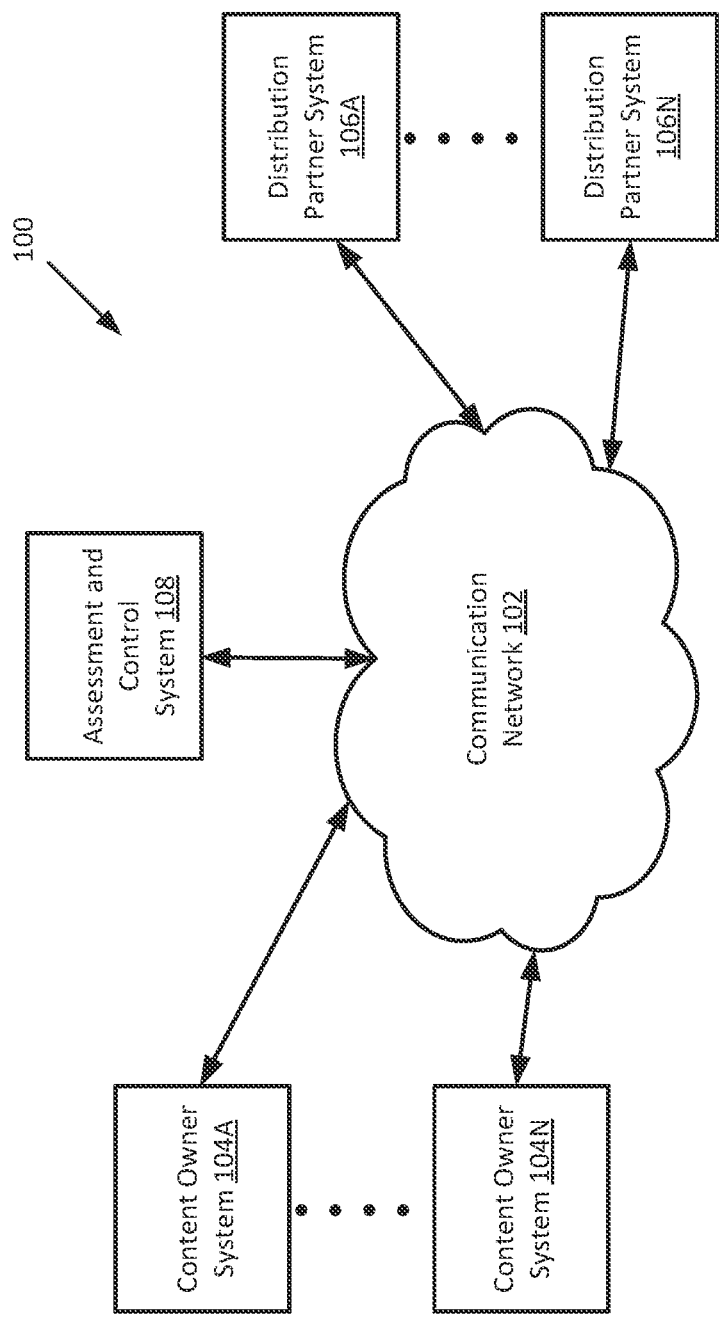
FIG. 1 depicts an example environment where an assessment and control system may receive agreement information and assess reports from distribution partner systems for any number of content systems in some embodiments.

FIG. 1 depicts an example environment 100 where an assessment and control system 108 may receive agreement information and assess reports from distribution partner systems 106A-N for any number of content systems 104A-N in some embodiments. The assessment and control system 108, distribution partner systems 106A-N, and content systems 104A-N may each include one or more digital devices. A digital device is any device with memory and a processor. Digital devices are further discussed herein.

A communication network 102 may represent one or more computer networks (e.g., LANs, WANs, and/or the like). The communication network 102 may enable communication with the assessment and control system 108 by one or more of the content systems 104A-N, and one or more distribution partner systems 106A-N. In some implementations, the communication network 102 comprises computer devices, routers, cables, uses, and/or other network topologies. In some embodiments, the communication network 102 may be wired and/or wireless. In various embodiments, the communication network 102 may comprise the Internet, one or more networks that may be public, private, IP-based, non-IP based, and so forth.

There may be any number of content owner systems 104A-N. Each content owner system 104A-N may be a system for tracking and/or receiving compensation, royalties, and/or the like related to content that is owned or represented by the respective content owner 104A-N. Content refers to any media that may be consumed by a consumer (e.g., a user). Examples of content include, but are not limited to, video, audio, games, streams, podcasts, programming, movies, series, documentaries, and/or the like. A content system 104A may be operated by an entity that owns or represents ownership of the content (e.g., an agency that represents select titles of content desired by consumers).

It will be appreciated that each content owner system may be unrelated and independent of other content owner systems. As such, the assessment and control system 108 may receive reports from any number of distribution partners and provide different compensation, audits, and control reports to one or more different content systems based on the titles represented/owned by the respective control system.

Content owners (e.g., that operates a content owner system) use different distributor partners to distribute the content owned and/or represented by the different content systems. In one example, a distribution partner 106A may be an Over-the-Top (OTT) distribution partner or a traditional distribution partner. An OTT distribution partner may be any service that provides content directly to viewers over the Internet. An OTT distribution partner may bypass cable, broadcast, and satellite television platforms. A traditional distribution partner may provide over-the-air (OTA) services such as television.

Examples of OTT services include, for example, subscription services (SVOD), transactional video on demand (TVOD), electric sell-through (EST), download to rent (DTR), premium video on demand (PVOD), advertising-supported video on demand (AVOD), free ad-supported TV (FAST), and pay TV. In more detail, an SVOD subscription service on demand allows consumers to consume as much content as they desire at a flat rate per month. TVOD services allow consumers pay on a pay-per-view basis. EST services allow a consumer to pay once to gain permanent access to content. DTR service allows a customer access to particular content for a limited time for a smaller fee. PVOD allows a consumer to consume content sooner than they would otherwise (e.g., streaming a movie at the same time that movie released in theaters). AVOD and FAST services may allow for free content consumption supported by advertising. FAST often differs from AVOD in that FAST is not "on demand." Examples of FAST services include Pluto TV (ViacomCBS), Xumo (NBCU), Tubi (Fox), Peacock (NBCU), The Roku Channel (Roku™), IMDbTV (Amazon), and Samsung TV+ (Samsung).

Examples of OTT distribution partners may include AMAZON, HULU, NETFLIX, DISNEY +, CURIOSITY STREAM, FUBO, and the like. In another example, a distribution partner 106B may be a traditional distribution partner for distributing content through broadcast television, over cable systems, or the like. It will be appreciated that some distribution partners may distribute content via the Internet as well as over traditional distribution channels.

The assessment and control system 108 may provide revenue control reports and/or optimization solutions that help accelerate growth within the media and entertainment sectors.

In various embodiments, the assessment and control system 108 may determine or receive performance and revenue rules for compensation between each content owner and the distribution partner they utilize. Revenue rules may be different for each different OTT and OTA services and different for each distribution partner depending on the negotiation with that partner. In various embodiments, the assessment and control system 108 may assess agreements between a content owner and a distribution partner to determine the criteria for revenue and performance (e.g., utilizing OCR and language translation to identify common terminology for revenue and performance evaluation, agreed payment, compensation rates, milestones, and/or the like).

The assessment and control system 108 may receive any number of periodic distribution reports from any number of distribution partners for each content owner. The assessment and control system 108 may create or retrieve a distribution template for each distribution report such that revenue information and content information may be retrieved from each distribution report. It will be appreciated that some distribution partners may utilize the same report format for different content owners and, as such, the assessment and control system 108 may create a distribution template for one content owner and then retrieve the same distribution template for retrieval of information from a different distribution report for a different content owner but from the same distribution partner.

In various embodiments, the assessment and control system 108 generates an interface and/or reports that assess distribution reports received from any number of distribution partners for each content owner. The interface may provide revenue and performance information across content (e.g., serials and non-serial content).

By utilizing a centralized system, the system may leverage distribution templates to assist in reducing time and cost for each content owner to create their own distribution template for each distribution report. Further, the centralized system may automate retrieval of information using each content owner's revenue and performance criteria in order to efficiently retrieve, process, and provide revenue and performance information across any number of different distribution reports from different distribution partners received at different times for different periods. As a result, errors are greatly reduced and action may be taken to promote performing content, change distribution channels (e.g., PVOD may turn out to be a better return on investment and also be sufficiently popular over the same content being provided by an SVOD service). Further, content channels may be changed to ensure consumption by markets that would otherwise not have access to content (e.g., third-world countries, second world-countries, distressed areas, and the like).

Figure 2:
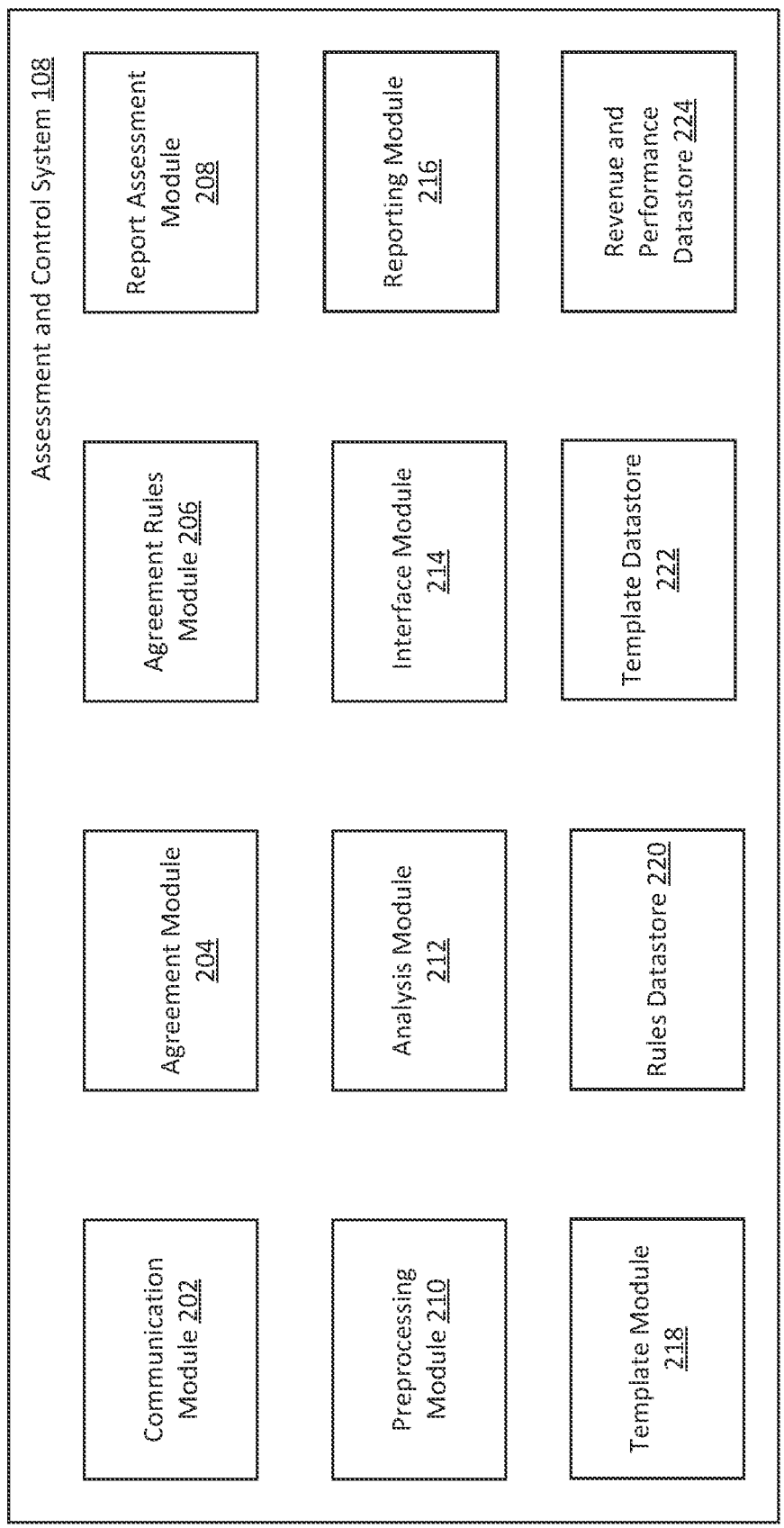
FIG. 2 depicts a diagram of an assessment and control system in some embodiments.

FIG. 2 depicts a diagram of an assessment and control system 108 in some embodiments. The assessment and control system 108 may determine revenue and compensation criteria, generate criteria rules, determine applicable report template(s) to retrieve distribution information from each report, process the information as needed, analyze distribution information to identify revenue and performance per title, store distribution information, assess the distribution information per title per partner, and provide the information within the dashboard graphical user interface 300 discussed herein (see FIG. 3). In some embodiments, the assessment and control system 108 may further provide a report that includes revenue and performance information for a content owner regarding the content owner's content distribution by any number of distribution partners.

As discussed, the assessment and control system 108 may provide a content owner with revenue information and performance information based on that content owner's content (e.g., titles), that content owner's separate agreements with different distribution partners, and the reports from the different distribution partners that have agreed to distribute the content owner's content. The assessment and control system 108 may provide similar analysis, service, and/or information to different content owners (e.g., regarding those content owners' content, their agreements with their distribution partners, and the reports for that content).

It may be appreciated that the assessment and control system 108 may identify templates for different reports and/or different distribution partners. Since different partners may format their reports differently, include different information, and/or change titles of content, the assessment and control system 108 may create a report template for different reports and/or different partners. The report template may indicate locations useful information may be retrieved from a distribution report such that the information may be automatically retrieved from the report. Once a template is created, the assessment and control system 108 may utilize the same template for the same formatted report from that particular distribution partner. As such, there is considerable savings of time, reduction of error, and increase in performance over each content owner manually assessing each report and/or each content owner creating their own (redundant) templates.

By being in the center of an architecture, the assessment and control system 108 may retrieve and/or receive reports from any number of distribution partners and provide information back to any number of content owners. If criteria of two or more content owners are similar and/or if reports for different content owners from the same distribution partner is similarly formatted, the assessment and control system 108 may save considerable time, improve computational efficiency, reduce error, and simplify complexity (e.g., particularly when there may be many different types of distribution) over the prior art.

The assessment and control system 108 may include a communication module 202, an agreement module 204, an agreement rules module 206, a report assessment module 208, a preprocessing module 210, an analysis module 212, an interface module 214, a reporting module 216, a template module 218, a rules datastore 220, a template datastore 222, and a revenue and performance datastore 224.

The communication module 202 may enable communications with the different content owners (e.g., content owner systems 104A-N) and different distribution partner systems 106A-N over the communication network 102. In various embodiments, the communication module 202 may receive distribution reports generated by one or more of the distribution partners. In some embodiments, one or more distribution partners of a particular content owner provide periodic distribution reports to the communication module 202. In various embodiments, one or more content owners may provide the distribution report(s) top the communication module 202.

The agreement module 204 may receive revenue criteria and/or performance criteria from the content owner. In various embodiments, the content owner accesses the dashboard graphical user interface 300 (discussed herein) and provides the revenue criteria and/or performance criteria for different distribution partners of the content owner. The revenue criteria, for example, may indicate payment to be received, conditions for payment, functions, and the like. Revenue criteria will differ depending on the channel. For example, revenue will be calculated differently for content provided OTA vs. OTT. Similarly, revenue is calculated differently for subscription services as compared to advertising-supported services, PVOD services, or the like.

In various embodiments, the agreement module 204 may receive an agreement between a particular content owner and a distribution partner. The agreement module 204 may perform natural language processing and other approaches to scan the agreement to identify revenue criteria and performance criteria. In various embodiments, the agreement module 204 may utilize understood terms and phrases to identify headers and/or language (e.g., words and phrases) associated with revenue criteria and performance criteria for compensation and performance measurements (e.g., including metrics, milestone, advertisement rates, number of advertisements, subscription fees, percentages, and the like).

In some embodiments, once the agreement module 204 has identified the revenue criteria and performance criteria from a particular agreement between a content owner and the distribution partner (e.g., after confirmation that the retrieved criteria is both correct and complete), the agreement module 204 may store an agreement template for that particular agreement between the particular content owner and the particular distribution partner. Future agreements between that particular content owner and the particular distribution partner may be similarly framed and, as such, the agreement module 204 may retrieve and utilize the agreement template as a supplement to language processing of the new agreement to assist in identification of revenue criteria and performance criteria. As the system is retrained and additional templates are developed, the agreement module 204 may increasingly automate retrieval if criteria from agreements to increase the speed for criteria identification.

The agreement rules module 206 may store the revenue criteria and performance criteria as revenue rules and performance rules. The revenue rules and performance rules may be particular to a particular content owner and a particular distribution partner. The revenue rules and performance rules may be stored in a content owner profile in the revenue and performance datastore 224.

Revenue rules may be criteria for determining payment. A revenue rule may be a flat or a percentage of a subscription fee, advertising revenue, transaction fee, or the like. In some embodiments, revenue rules may change depending on amount of consumption, time of consumption, programs, and the like. As such, a revenue rule may include several different rates that depend upon condition factors (e.g., amount of consumption, when content consumption occurred, and/or special programs).

Similarly, performance rules may be criteria for determining how to assess performance of content (e.g., amount of consumption, factors that affect consumption, minutes watched, number of streams, unique views, number of sessions, and/or the like). In some embodiments, performance rules may change depending on amount of consumption, time of consumption, programs, and the like. As such, a performance rule may include several different metrics that depend upon condition factors (e.g., amount of consumption, when content consumption occurred, and/or special programs).

Figure 4:
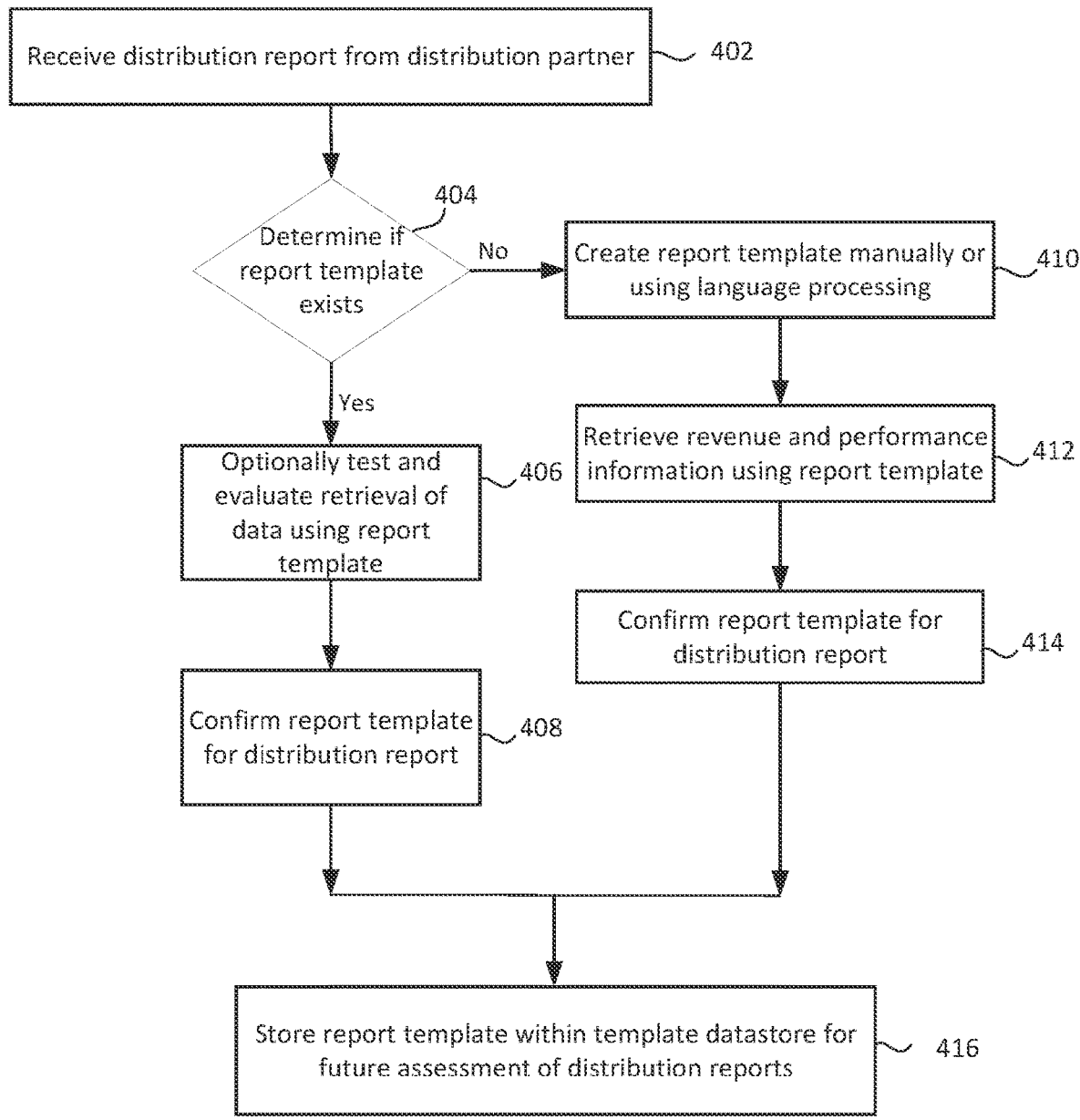
FIG. 4 is a flowchart for creating a distribution template in some embodiments.

The report assessment module 208 may create distribution template(s) for one or more distribution reports. FIG. 4 is a flowchart for creating a distribution template in some embodiments. In step 402, the communication module 202 receives a distribution report from a distribution partner.

In step 404, the report assessment module 208 may determine if a report template already exists in the template datastore 222. In some embodiments, the report assessment module 208 may determine if a report template already exists that is associated with a distribution report from the particular distribution partner that sent the distribution report for the particular content owner.

If the report assessment module 208 determines that a report template exists for the distribution report (e.g., based on the sending distribution partner and the content owner), the report assessment module 208 may optionally test retrieval of information from the distribution report by retrieving some data from the distribution report in step 406. As discussed herein, the report template assists the preprocessing module 210 to retrieve information from specific locations (e.g., columns and/or rows) from the distribution report. The report assessment module 208 may retrieve at least some information from the distribution report and then automatically review the retrieved information for errors. If no errors are found, then the distribution template may be confirmed and the distribution template stored in the template datastore 222 in step 408.

In step 410, if a distribution template is not found that matches the distribution report, the report assessment module 208 may assist with evaluation of the distribution report. In some embodiments, the report assessment module 208 may provide the distribution report to a user (e.g., using the dashboard graphical user interface 300). The user may be a user from the assessment and control system 108 or the applicable content owner. The user may create a distribution template based on review of the distribution report.

In some embodiments, the report assessment module 208 may automatically review the distribution report and utilize language recognition to identify headers indicating the type of data contained in locations in the distribution report. For example, the report assessment module 208 may recognize terms such as "marketplace," "country," "invoice ID," "transaction ID," "transaction time," "title," "item name," "item type," "sales price," "currency," "provider," "SKU," "begin date," "end date," "distributor ID," "customer price" "category," "subscription," "device," "parent identifier," "channel name," "device type," "total views," "unique views," "average sessions," "duration," "date," "session count," "unique viewers," "session count," "total viewership," "series name," "unique streams," "offer type," "season ID," "season name," "series ID," and the like.

In step 412, the report assessment module 208 may retrieve revenue information and/or performance information from the distribution report based on the headers and/or recognized information. The report assessment module 208 may then assess if correct values are received (e.g., formatted values as expected are received from proposed mappings of information of the distribution report).

In various embodiments, the report assessment module 208 may identify the distribution partner that provided the distribution report and scan the distribution report based on terms and headings typically used by the distribution partner and/or the type of channel that the content is being distributed (e.g., SVOD, TVOD, PVOD, FAST, and/or traditional channels). If headings are not identified or recognized, the unknown or uncertain headings may be provided to the user for clarification. If all headings within the distribution report are recognized, the report assessment module 208 may retrieve information from the distribution report using the headings to indicate location and type of contained information.

In some embodiments, the report assessment module 208 may receive retrieved data from the distribution report for errors (e.g., indications of the wrong type of data such as text where there should be values, mismatched formatting, unknown data, corrupted data, and the like). If there are no errors, in step 414, the report assessment module 208 may confirm a distribution template for the distribution report and future distribution reports from the particular distribution partner and the particular content owner.

In step 416, the distribution template may be stored in the template datastore 222.

The preprocessing module 210 may utilize a distribution template from the template datastore 222 to retrieve revenue information and performance information from a distribution report. In various embodiments, when the communication module 202 receives a distribution report, the preprocessing module 210 may identify an applicable distribution template. Each distribution template may include identifiers such as applicable content owner, applicable distribution report, and/or other information that may be obtained from the distribution report to assist in identifying the applicable distribution report. The preprocessing module 210 may then retrieve the applicable distribution template from the template datastore 222 and utilize the information (e.g., mappings) to retrieve the revenue information and performance information from the distribution report.

In various embodiments, the preprocessing module 210 utilizes revenue rules and performance rules obtained by the agreement rules module 206. For example, an agreement between a particular content owner and a particular distribution partner may condition revenue on number of views (e.g., milestones), unique views over a period of time, and/or date ranges. The revenue rules and performance rules may require that information to be retrieved by the assessment and control system 108 from the distribution report to be able to assess revenue and performance. As such, the preprocessing module 210 may utilize at least some mappings (and potentially ignore other mappings) to retrieve the needed information from the distribution report (e.g., number of views, unique views, date ranges, and the like). In some embodiments, the report assessment module 208 creates a distribution template that only includes mappings (e.g., identifies locations within the distribution report) that are useful based on the revenue rules and performance rules (e.g., identifying needed mappings based on the revenue rules and performance rules, mapping locations for the needed information, and not providing mapping to any information not needed by the revenue rules and the performance rules).

The preprocessing module 210 may receive the data from the distribution report. In some embodiments, the preprocessing module 210 may also perform certain functions on the retrieved data based on the revenue rules and the performance rules. It will be appreciated that the distribution report may include many measurements and values, but further analysis or functions on the data are necessary to determine payments based on the particular agreement between the content owner and the distribution partner (e.g., based on the revenue rules and/or the performance rules). For example, if the revenue rules require a number of unique views over a certain range, the preprocessing module 210 may obtain a total number of unique views from the distribution report and apply one or more functions to determine if the unique views occurred during the date range of interest. Revenue and performance may be assessed in any number of ways and the preprocessing module 210 may apply functions to the retrieved information from the distribution report to obtain the needed measurements, numbers, metrics, revenue, payments, and the like.

In various embodiments, the preprocessing module 210 identifies a distribution template associated with a distribution report. The distribution template may be stored in the template datastore 222. Each distribution template may include keywords and/or other information to identify the distribution template. In some embodiments, the preprocessing module 210 receives the distribution report from a distribution partner for a particular content owner. Based on the distribution partner and/or the content owner, the preprocessing module 210 may retrieve the applicable distribution template. Using the distribution template, the preprocessing module 210 may retrieve information from the distribution report.

The preprocessing module 210 may retrieve report rules from the rules datastore 220. The report rules may be retrieved from an agreement between the content owner and the distribution report (e.g., manually configured or automatically identified). In some embodiments, the report rules are generated based on the agreement between the content owner and the distribution report.

In some embodiments, the preprocessing module 210 identifies a title from the distribution report. In various embodiments, the preprocessing module 210 compares titles in the distribution report to a list of titles provided by the content owner (e.g., provided as a list over the dashboard graphical user interface 300 or provided as a part of an agreement between the content owner and the distribution partner). As used herein, a "title" may refer to particular content owned by the content owner. In one example, a "title" may refer to a single event such as a movie, show, performance, or the like. In another example, a "title" may refer to a particular episode of a series such as, for example, a particular episode of a show (e.g., TV show), podcast, serial, or the like.

Subsequently, the preprocessing module 210, using the distribution template, may identify revenue information and/or performance information for that particular title. Once a title is identified, the preprocessing module 210 may retrieve information associated with the title, such as revenue information and performance information. Revenue information is information related to monetary value associated with consumption and/or distribution of the title. Revenue information may be, for example, subscription fees, license fees, rental fees, advertising fees, and/or the like. The revenue information may be revenue to be paid based on that particular title over the period of time and/or may be based on revenue earned by the distribution partner for that particular title over the period of time. Performance information is information related to consumption such as number of views, minutes watched, demographics of consumers, time of consumption, date of consumption, and the like.

Examples of the results of the analysis module 212 are discussed in the context of a graphical user interface that is accessible by the content owner. FIG. 3 depicts a dashboard graphical user interface 300 in some embodiments. The dashboard graphical user interface 300 includes a revenue card, number of new distributers card, a number of new titles card, and a number of new reports card. The information in each of the cards 302-308 may be updated periodically (e.g., quarterly, monthly, weekly, daily, hourly, or the like). In some embodiments, the information in each of the cards 302-308 may be updated in real-time. In some embodiments, a user may change a setting such that one or more of the cards 302-308 may update at a selected period (e.g., in real time, quarterly, monthly, weekly, daily, hourly, or the like). The dashboard graphical user interface 300 further includes a transaction revenue-projections table 310 and a viewing behavior-projections table 312. The dashboard graphical user interface 300 may further include an upcoming promotions table and a title launches with an availability table.

It will be appreciated that a user may configure the dashboard graphical user interface 300 using the gear icon to rearrange cards, rearrange tables, add new cards, remove cards, add new tables, and/or remove tables.

In the example in FIG. 3, card 302 depicts revenue since the last month. It will be appreciated that the card 302 may be configured by the user to show revenue over any period (quarterly, yearly, monthly, weekly, daily and/or the like).

The analysis module 212 may determine revenue of a content owner's one or more titles (e.g., serials and/or non-serials) being distributed by its distribution partners. In some embodiments, distribution reports are provided to the assessment and control system 108 from any number of distribution partners that distribute content for the content owner. The analysis module 212 may assess revenue information (e.g., data indicating payments, compensation, subscriptions, advertising revenue, flat fees, and the like) from one or more distribution report(s) and aggregate revenue from the reports for each title of the content owner as well as aggregate revenue across all titles and across all distribution reports. For example, the analysis module 212 may calculate revenue for each title and include details regarding how much revenue per title was earned by the different channels of a particular distribution partner, as well as how much revenue per title was earned by any number of channels (e.g., FAST, PVOD, SVOD, direct sales, and the like) across any number of distribution partners.

Further, the analysis module 212 may also obtain title information and distributor information from a distribution report and/or agreement. In some embodiments, the agreement module 204 may identify a list of titles of the content owner to be distributed by a particular distribution partner. The list of titles may be stored and tracked over time such that the analysis module 212 can track the number of active titles being distributed, which active titles are being distributed, and track any omissions or additions (e.g., comparing the list of titles from an agreement with the distribution partner's titles identified in the distribution report).

Similarly, the analysis module 212 may track a number of distributors based on the number of different distribution partners that have signed agreements and/or are providing distribution reports to a content owner.

In some embodiments, the analysis module 212 may compare applicable revenue values (e.g., based on the preprocessing module 210 assessment of needed revenue processed and/or retrieved from the distribution report) to thresholds (either a flat threshold provided by a user, an automatic threshold provided by the assessment and control system 108, or a rate of change threshold). If a threshold is exceeded (e.g., either above a high threshold or below a low threshold), the content owner and/or the user of the assessment and control system 108 may be notified (e.g., by an alert in the dashboard graphical user interface 300, email, text message, or the like).

For example, if the preprocessing module 210 determines that the number of views for a popular title is below a threshold or 0, then the distribution template may be incorrect for the distribution report and changes may need to be required. As such, the information may need to be confirmed. Similarly, if the number of views for a title is surprisingly above expectations (e.g., above a high threshold and/or a significant change from the previous time period), then the communication module 202 may provide a similar notification to confirm the data and/or allow the content owner to take advantage of the value of the content (e.g., by reviewing performance taking advantage of the particular channel, negotiating different terms moving forward, and/or transitioning other titles to channel opportunities such that they may be similarly consumed).

Thresholds may be determined based on historical data (e.g., historical revenue by the content owner for one or more different distribution partners and/or historical consumption information such as views, sessions, duration of session, and the like).

It will be appreciated that tracking the revenue and performance information against various content owner thresholds may allow for AB testing of particular content (e.g., particular serials and/or non-serials). For example, a content owner may include a revenue rule or performance rule for limited purposes and for a limited time. The preprocessing module 210 may retrieve the needed information from the distribution report based on those particular revenue rules and/or performance rules and the analysis module 212 may further compare performance to the content owner's thresholds to provide information to the content owner for AB testing (e.g., changes in title accessibility, channel distribution, promotion, and the like for a limited time for all or some viewers of a distribution partner). The analysis module 212 may provide the information to the dashboard graphical user interface 300 and/or a report to enable the content owner to assess results of the AB test.

The analysis module 212 may aggregate (e.g., add) all content owner revenue related to tracked content for a content owner across any number of distribution partners to generate a total revenue. The total revenue may be displayed on a card (e.g., card 302) of an interface (e.g., dashboard graphical user interface 300) for any period of time. In some embodiments, the analysis module 212 may determine a percentage increase or decrease relative to previous time periods.

The analysis module 212 may also determine the total number of distributors (e.g., distribution partners) identified by the content owner. In some embodiments, the analysis module 212 may display the total number of distribution partners on a card (e.g., card 304). In some embodiments, the analysis module 212 may determine a percentage or total number increase or decrease relative to previous time periods.

The analysis module 212 may also determine the total number of new titles (e.g., new content) identified by the content owner for tracking by the assessment and control system 108. In some embodiments, a content owner may input titles to be tracked to the assessment and control system 108 (e.g., by entering the title information into a database), providing a .cvs file where the assessment and control system 108 may automatically add titles from the .cvs file to a revenue and performance datastore 224 (i.e., a data structure that contains the titles to be assessed by the assessment and control system 108 for revenue and compensation), and/or the like. In some embodiments, the analysis module 212 may display the total number of new titles on a card (e.g., card 306 of dashboard graphical user interface 300). In some embodiments, the analysis module 212 may determine a percentage or total number increase or decrease relative to previous time periods.

The analysis module 212 may also determine the total number of new reports (e.g., reports from the distribution partners) received or to be received by the assessment and control system 108. In some embodiments, the analysis module 212 may track the number of reports received over time. The analysis module 212 may compare the number of new reports to the number of previously received reports over a previous time period and provide the total number of new reports on a card (e.g., card 308 of dashboard graphical user interface 300). In some embodiments, the analysis module 212 may determine a percentage or total number increase or decrease relative to previous time periods.

The analysis module 212 may also generate the transaction revenue table 310 as well as the viewing behavior (e.g., performance) table 312 of dashboard graphical user interface 300. In various embodiments, the analysis module 212 lists distributors from any number of different distribution reports received during a predetermined period of time (e.g., current months). From the distribution reports received, the analysis module 212 may identify the number of titles being distributed by each distribution partner (e.g., based on an agreement between the content owner and the particular distribution report and/or determining the number of titles identified in the distribution reports).

As discussed herein, the preprocessing module 210 may determine revenue information for each title for each distribution partner based on information from each distribution report (e.g., revenue provided to the content owner). In some embodiments, the analysis module 212 may aggregate all revenue per distribution partner and provide the information for the time period in the transaction revenue—projections table 310 (e.g., as "last month Paid ($)").

In some embodiments, a distribution report covers a portion of a time period. In one example, a particular distribution partner may provide distribution reports weekly, daily, or in real time. In various embodiments, the analysis module 212 may forecast (e.g., project) revenue over the entire predetermined time period using the revenues provided by one or more distribution reports. For example, if a distribution report contains information for the past two weeks, the analysis module 212 may double all or some revenue information to project performance for the rest of the month. In some embodiments, the analysis module 212 may utilize historical data (e.g., how the title performed last month, last year, and/or under similar circumstances) to make predictions for forecasted revenue. The analysis module 212 may optionally provide the information on the dashboard graphical user interface 300 (e.g., within the transaction revenue—projections table 310). In some embodiments, the analysis module 212 may also determine a percentage increase or decrease of the projected revenue as compared to the previous time period (e.g., the previous month).

As discussed herein, the preprocessing module 210 may determine performance information for each title for each distribution partner based on information from each distribution report (e.g., performance provided to the content owner). In some embodiments, the analysis module 212 may aggregate all performance metrics per distribution partner and provide the information for the time period in the viewing behavior—projections table 312 (e.g., as "mins watched").

In various embodiments, the analysis module 212 may forecast (e.g., project) performance (e.g., project various performance metrics) over the entire predetermined time period using the performance information provided by one or more distribution reports. For example, if a distribution report contains information for the past two weeks, the analysis module 212 may double all or some performance information to project performance for the rest of the month. In some embodiments, the analysis module 212 may utilize historical data (e.g., how the title performed last month, last year, and/or under similar circumstances) to make predictions for forecasted performance. The analysis module 212 may optionally provide the information on the dashboard graphical user interface 300 (e.g., viewing behavior—projections table 312 as "projected view minutes"). In some embodiments, the analysis module 212 may also determine a percentage increase or decrease of the projected performance as compared to the previous time period (e.g., the previous month).

In various embodiments, the analysis module 212 compares data (e.g., metrics) from the distribution report to the revenue rules as well as payments identified by the distribution report. The analysis module 212 may then determine if the revenue obtained from the distribution partner (e.g., either listed in the report or received by the content owner separately) matches revenue that should have been earned (e.g., based on the revenue rules from the applicable agreement and the metrics/income indicated in the distribution report). If there is a shortfall or excess, the analysis module 212 may provide a notification to the content owner and/or the distribution partner for review and correction.

In various embodiments, the analysis module 212 may identify upcoming promotions from agreements and/or title launches with availability from agreements and/or distribution reports.

The interface module 214 may display and provide interoperability of the graphical user interface such as dashboard graphical user interface 300.

The reporting module 216 may generate a separate assessment report (e.g., summarizing information from the graphical user interface or providing all applicable revenue and performance information from the content owner's distribution partners based on the revenue rules and the performance rules). In various embodiments, the assessment report indicates payments based on content consumption and any shortfalls or excesses by the analysis module 212 comparing the data (e.g., metrics) from the distribution report to the revenue rules as well as payments identified by the distribution report.

The template module 218 may track templates based on applicable content owner, distribution partner, and the like. In some embodiments, the template module 218 may tag templates based on distribution partner or other criteria such as particular distribution methodology (e.g., SVOD) and provide templates to the report assessment module 208 to use to assist in identifying a correct template.

In some embodiments, the template module 218 may tag specific mappings for a particular distribution partner within a template and only provide the mappings to the report assessment module 208 for new template creation. For example, when a new distribution partner is obtained, the template module 218 may provide the report assessment module 208 with parts of other templates for similar channels (e.g., SVOD or FAST channels) that have been used by the same distribution partner but for a different content owner (or a different distribution partner that provides similar channel services). Similarly, the template module 218 may provide common terminology from other templates or distribution reports that identify needed information when performing language processing for the location of needed information.

The report assessment module 208 may utilize the template, template portions, or language to test information retrieval and/or provide suggestions to a user for template creation, thereby speeding the process of template creation and/or increasing accuracy.

The rules datastore 220 stores and tracks revenue rules and performance rules (optionally including historical revenue rules and performance rules). A datastore is any data structure (e.g., one or more tables, databases, and/or the like) for storing information. Similarly, the template datastore 222 may store templates, portions of templates, and/or language used to scan distribution reports (optionally including historical templates, portions of templates, and/or language).

Further, the revenue and performance datastore 224 may store all data retrieved from the distribution reports, including any preprocessing (e.g., functions), analysis, thresholds, notifications, reports, and the like (including historical information).

In some embodiments, the reporting module 216 may provide a report allowing for recreation and auditing of distribution reports received, revenue rules, performance rules, processing, analysis, thresholding, and the like (e.g., all activities of the assessment and control system 108 and/or decision making related to revenue and performance). This will allow for compliance for audits, confidence, and improvement.

Figure 5:
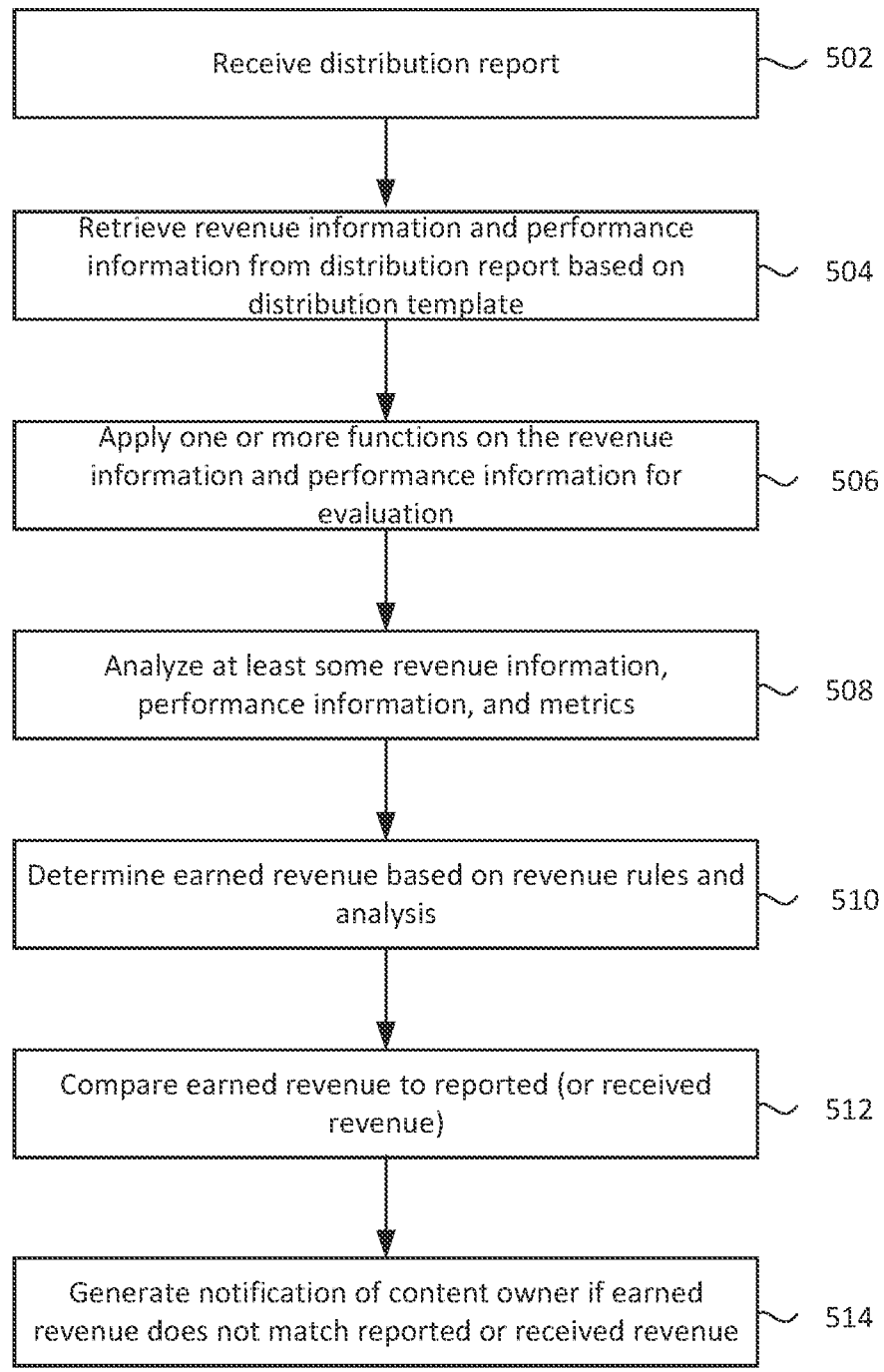
FIG. 5 is a flowchart for determining if earned revenue matches received or reported revenue in some embodiments.

FIG. 5 is a flowchart for determining if earned revenue matches received or reported revenue in some embodiments. It will be appreciated revenue may be calculated or determined using the distribution report (which includes specific transactions, consumption data, and the like) and the agreed criteria for compensation (e.g., as indicated in the agreement between the content owner and the distribution partner). The earned revenue may be based on the metrics and criteria of the distribution report and the agreement may be compared against revenue identified in the distribution report as being provided to the content owner or the actual money received by the content owner. Shortfalls or excesses may be reported based on the comparison.

In step 502, the communication module 202 may receive a distribution report. In step 504, the preprocessing module 210 may retrieve revenue information and performance information from the distribution report using the applicable distribution template (e.g., retrieved from the template datastore 222). In some embodiments, in step 506, the preprocessing module 210 may optionally perform any functions necessary to obtain needed metrics and/or compensation information based on the revenue rules and/or performance rules. For example, certain revenue rules may require information that is not immediately copyable from the distribution report but requires functions or divisions using information from the distribution report to generate the necessary information for evaluation and analysis.

In step 508, the analysis module 212 analyzes at least some of the revenue information, performance information, and (optionally) the outcome of any functions. In some embodiments, the analysis module 212 compares information to thresholds and analyzes the information in view of various criteria as indicated by the revenue rules and/or performance rules. In step 510, the analysis module 212 may determine earned revenue due to the content owner based on the information contained in the distribution report and the revenue rules.

In step 512, the analysis module 212 may compare the earned revenue against actual payments from the distribution partner or the payments indicated in the distribution report. In step 514, the communication module 202 and/or reporting module 216 may provide a notification to the content owner (e.g., to the content owner system) via email, SMS, phone call, or the like if there is a shortfall and/or an excess of payment based on the comparison.

In various embodiments, the interface module 214 may indicate in the dashboard graphical user interface 300 if there is a mismatch of expected and actual payments based on the analysis (e.g., with flags or special indications that further review is necessary).

As discussed herein, a user of the content owner or assessment and control system 108 may change settings. In various embodiments, the dashboard graphical user interface 300 may include an option (e.g., in a menu) to select "settings." FIG. 6 depicts a settings graphical user interface 600 in some embodiments. A user, in some embodiments, may navigate to the settings graphical user interface 600 from the dashboard graphical user interface 300.

The graphical user interface 600 may indicate which cards to be available. In some embodiments, a user may create cards by programming or selecting analysis, metrics, and/or information from one or more distribution reports to display. In this example, the user has selected "Last Month Revenue," "# of New Distributors," "# of New Titles," and "# of New Series." As such, those cards may appear on the dashboard of the dashboard graphical user interface 300 (e.g., the first screen when the graphical user interface is initiated). In this example, "Total Distributors," "Total Titles," and "Total Series" have not been selected so cards with that information may not be available.

The graphical user interface 600 may also provide opportunities for the user to select tables to include on the dashboard graphical user interface 300 including, for example, "Transaction Revenue-Projections," "Viewing Behavior-Projections," "Upcoming Promotions," and "Title Launches with Avails." It will be appreciated that the user may create or program tables for any number of distribution partners and any number of distribution reports. For example, the user may create a table for revenue and a table for performance (e.g., without projections). In some embodiments, the user may create tables for particular types of channels (e.g., SVOD, PVOD, FAST, traditional, and the like) so that information may be separately tracked depending on distribution method.

It will be appreciated that the graphical user interface 600 may provide options to create notification settings. In one example, a user may configure the graphical user interface 600 to provide notifications (e.g., via email or SMS) when revenue or performance exceeds an upper threshold or falls below a lower threshold. The thresholds may be configured by the user. Similarly, the graphical user interface 600 may be configured to provide notifications if a distribution report provides erroneous information (e.g., when a report changes and the pre-existing template does not retrieve correct information).

In some embodiments, the graphical user interface 600 may provide the user the option to change distributors configuration that may impact distribution templates, periods of time when reports are expected to be received, and the type of channel the distribution partner provides. FIG. 7 depicts a distribution configuration settings graphical user interface 700 for changing settings of the distribution configuration in some embodiments.

In various embodiments, a user may change revenue rules, performance rules, and/or distribution template(s) for different distribution partners. In one example, a user may identify a distribution partner (e.g., by entering a name or selecting the distribution partner through a drop-down menu). When a distribution partner is selected, the assessment and control system 108 may retrieve the fields (for compensation and/or performance information) and distribution report mappings for that particular distribution partner. The user may change the fields and/or remap where information from the distribution partner is retrieved. For example, if the distribution report changes, a user may change the location where information is to be retrieved from the distribution partner so the assessment and control system 108 may continue to automatically retrieve revenue information and performance information from the distribution report and provide the necessary information (either before or after further processing).

Once a user makes changes to mappings, an updated distribution template may replace the older distribution template. In various embodiments, the assessment and control system 108 may store and track the different distribution templates so that they may be reused later. For example, if a particular content owner requests a change to their particular distribution report, distribution reports with the previous data format may continue to be used by other content owners. As such, the assessment and control system 108 may track usage of distribution report types and formats to ease identifying the correct distribution template if one already exists, thereby allowing the assessment and control system 108 to leverage the knowledge of different distribution partners, different distribution reports, and/or distribution templates. This reduces error, increases computational efficiency, and allows for learning to be built upon.

FIG. 8 depicts a content graphical user interface 800 in some embodiments. In this example, the graphical user interface 800 may be accessed through the user interacting with a content link or interface on the dashboard graphical user interface 300. The graphical user interface 800 may enable the user to list titles (e.g., single titles and/or series) that the content owner is assessing through the dashboard graphical user interface 300.

In various embodiments, the graphical user interface 800 may list each title of the content owner. The 800 may identify each title-by-title name, title identifier, series name, series identifier, genre, territories (open or closed), rights holder, availability date, end date (of availability), and/or current status (e.g., active or inactive). It will be appreciated that the additional information or less information may be displayed in the graphical user interface 800.

In various embodiments, the user may engage with a record (e.g., a row) or title to obtain additional information. In graphical user interface 800, the user may have engaged with the title name "Trolls World Tour" (title ID T-500013) by engaging with an arrow or icon besides the title. It will be appreciated that the user may obtain additional information for any title in any number of ways.

In this example, once the user selects a title for additional information, the graphical user interface 800 may provide additional information such as the distributor information for the distribution partner that is distributing that particular title. In this example, there are two different distribution partners distributing this particular title, including Roku (distributor ID D-500001) and Pluto TV (distributor ID D-500002). The distribution information provided by the graphical user interface 800 may include, for example, a distributor ID, distributor name, distributor title ID (e.g., the distribution partner's identifier for the particular title), and distributor title name (e.g., the distribution partner's name for the particular title). It will be appreciated that the additional information or less information may be displayed in the graphical user interface 800.

In various embodiments, the user may perform additional actions related to distributors and/or titles. The additional actions may include, for example, changing distributor name, identifier, names, changing status, availability dates, territories, genres, title ID end dates, and/or the like.

In various embodiments, the user may export the list of titles including related information or add additional titles (e.g., by engaging in controls available on the graphical user interface 800).

In some embodiments, the content tracked by graphical user interface 800 may be separated into titles and series. As used herein, a "title" may refer to a movie, event, series episode, or the like. Within graphical user interface 800, the term "title" may refer to movies and events, while "series" may separately refer to content that are serials (e.g., multiple episodes that are or were produced for a season).

FIG. 9 depicts a distributors graphical user interface 900 in some embodiments. In this example, the graphical user interface 900 may be accessed through the user interacting with a distributor link or interface on the dashboard graphical user interface 300. The graphical user interface 800 may enable the user to list titles (e.g., single titles and/or series) that the content owner is assessing through the dashboard graphical user interface 300.

The distributors graphical user interface 900 may enable the user of the content owner to list distribution partners that distribute content for the content owner. The distributors graphical user interface 900, for example, may provide a list of distributor names, distributor IDs, # of active series (e.g., number of titles that are serials that are currently being distributed or offered for distribution by the particular distribution partner for the content owner), # of active titles (e.g., number of titles that are movies or events that are not serials and that are currently being distributed or offered for distribution by the particular distribution partner for the content owner), start date (under the current agreement with the particular distribution partner), end date, and status (e.g., active or inactive).

In various embodiments, the user may engage with the name of each distributor name to obtain further information regarding the distributor including, for example, content owner's titles/serials being distributed by the distribution partner, contact information, identifier, revenue provided by the distribution partner, and/or the like. The user may optionally engage with an action (e.g., depicted as three dots in the distributors graphical user interface 900) to make changes related to a distributor, including changing the name, identifier, # of active series/titles, start date, end date, and/or status.

In various embodiments, the user may export the list of distributors including related information or add additional distributors (e.g., by engaging in controls available on the graphical user interface 900).

FIG. 10 depicts a distributors graphical user interface 1000 in some embodiments. In this example, the graphical user interface 1000 may be accessed through the user interacting with a particular distributor on the distributors graphical user interface 900.

The user may select particular distribution partner from the list of distribution partners on the distributors graphical user interface 900. In this example, the user selected Pluto TV form the list of distribution partners.

Once selected, the distributors graphical user interface 1000 may be generated listing the titles (e.g., names of series & titles) that are distributed by the distribution partner for the particular content owner. In this example, three episodes of "Game of Thrones" is identified as being distributed by Pluto TV as well as two episodes of "Breaking Bad."

The distributors graphical user interface 1000 may provide a list of names of each series or title, a list of episode names (e.g., identified as "Titles" in distributors graphical user interface 1000), a start date, end date, and a status (e.g., active or inactive). The distributors graphical user interface 1000 may list any number of series and titles being distributed by the distributor name.

The distributors graphical user interface 1000 may also list additional information associated with the selected distribution partner including, for example, the distribution partner's name, their ID, # of series (e.g., total number of active and inactive series that are, have been, or will be distributed by the distribution partner), # of titles (e.g., total number of active and inactive titles that are not serials and that are, have been, or will be distributed by the distribution partner), # of active series (e.g., actively being made available for consumption by the distribution partner), # of active titles (e.g., actively being made available for consumption by the distribution partner), start date (of the current agreement between the distribution partner and the content owner), as well as the end date (of the current agreement between the distribution partner and the content owner). It will be appreciated that additional or less information may be made available over the distributors graphical user interface 1000.

Figure 11:
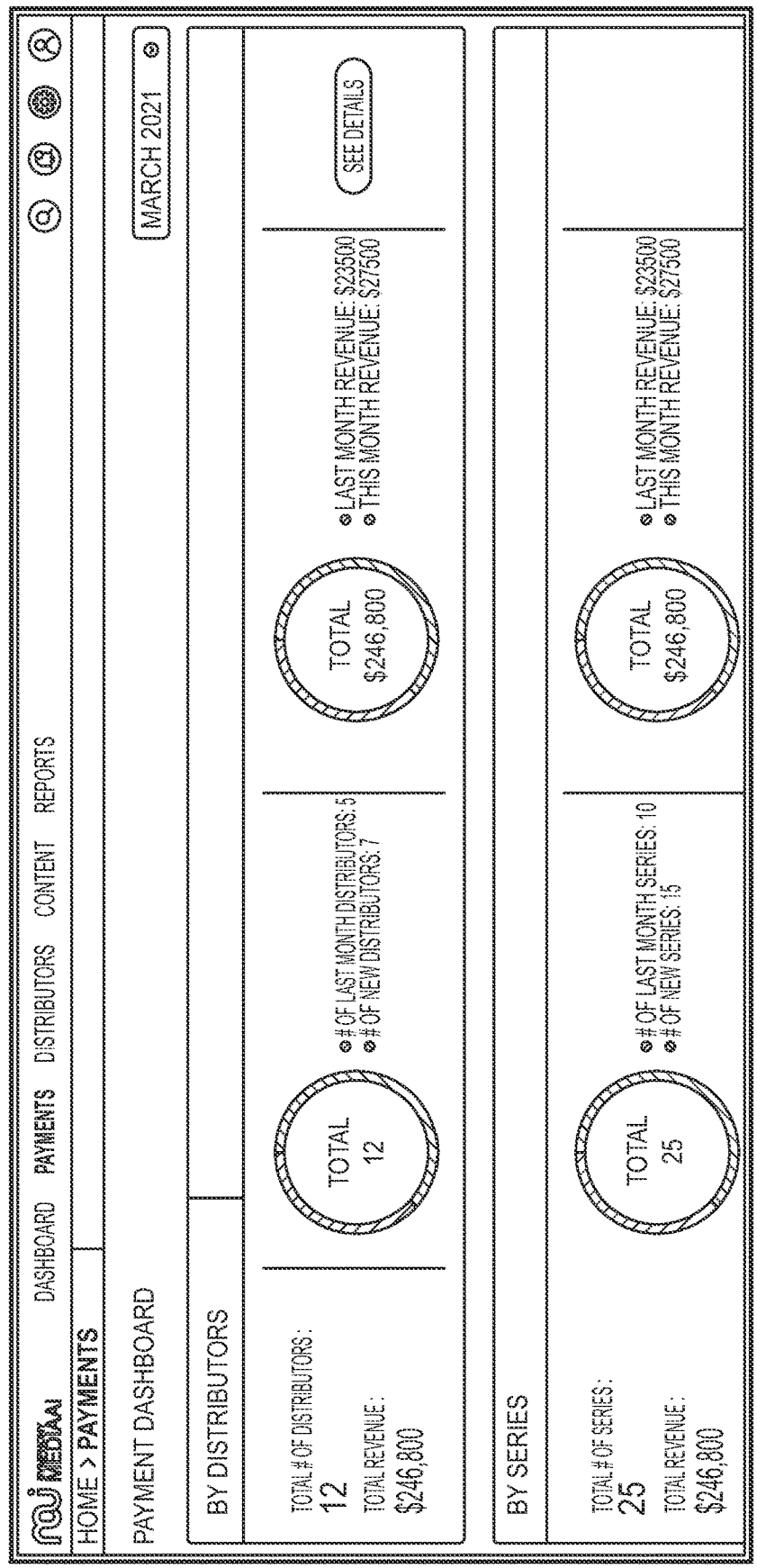
FIG. 11 depicts a payments dashboard graphical user interface in some embodiments.

FIG. 11 depicts a payments dashboard graphical user interface 1100 in some embodiments. In this example, the payments dashboard graphical user interface 1100 may be accessed through the user interacting with a payments link or interface on the dashboard graphical user interface 300. The payments dashboard graphical user interface 1100 may enable the user to list revenue information such as payments by the distribution report for rights to distribute the content owner's titles.

The payments dashboard graphical user interface 1100 may depict text, values, tables, or graphics (e.g., circular graphs, line graphs, pie graphs, or the like) indicating payments. The payments dashboard graphical user interface 1100 in this example depicts a total number of distribution partners for the content owner, the total revenue per period (e.g., in this case, as of March 2021 and over the last month or year). The payments dashboard graphical user interface 1100 in this example also provides graphs indicating the number of new distributors from the last period (e.g., there are two new distribution partners over last month's totals) and the total revenue (e.g., payments by the distribution partners to the content owner) over the previous month and current month. The payments dashboard graphical user interface 1100 provides an option to see additional details regarding the distributors. In some embodiments, by engaging in a "see details" button or link, the user may obtain additional information such as distribution reports, distribution partners (e.g., through the distribution graphical user interface), and/or the like.

The payments dashboard graphical user interface 1100 may also provide payment information by series and/or by non-serial content. In some embodiments, the payments dashboard graphical user interface 1100 provides a series card on the interface indicating the total number of series being currently offered and the total revenue for the series. The payments dashboard graphical user interface 1100 in this example also provides graphs indicating the number of new series from the last period (e.g., there are five new series over last month's totals) and the total revenue (e.g., payments by the distribution partners to the content owner) over the previous month and current month with regard to the series.

In some embodiments, the payments dashboard graphical user interface 1100 provides a non-serial content card on the interface indicating the total number of non-serial content being currently offered and the total revenue for the non-serial content. The payments dashboard graphical user interface 1100 in this example may provide graphs indicating the number of new non-serial content from the last period and the total revenue (e.g., payments by the distribution partners to the content owner) over the previous month and current month with regard to the non-serial content.

FIG. 12 depicts a payments detail dashboard graphical user interface 1200 in some embodiments. In this example, the payments detail dashboard graphical user interface 1200 may be accessed through the user interacting with a "see details" link or interface on the graphical user interface 1100. The payments detail dashboard graphical user interface 1200 may enable the user to list payment and performance metrics per different distribution partner regarding the content owner's content.

The payments detail dashboard graphical user interface 1200 may depict text, values, tables, or graphics (e.g., circular graphs, line graphs, pie graphs, or the like) indicating payment and/or performance. In this example, the payments detail dashboard graphical user interface 1200 may list the active distribution partners that distribute content for the content owner. For each distribution partner, the payments detail dashboard graphical user interface 1200 may provide a list of active series they distribute for the content owner, the list of active titles (e.g., non-series content), the total minutes streamed of the content owner's content by that particular distribution partner, the gross revenue (e.g., payments) for the rights and/or consumption of the content owner's content, and net revenue for the rights and/or consumption of the content owner's.

In various embodiments, the payments detail dashboard graphical user interface 1200 may provide the option to export the information displayed in the payments detail dashboard graphical user interface 1200.

In various embodiments, as discussed herein, the assessment and control system 108 may receive distribution reports from each of the distribution partners and then retrieve and process information based on the revenue and/or performance rules between the distribution partner and the content owner. The preprocessing module 210 may count the number of active titles (series and non-series) identified in a distribution report. In some embodiments, the preprocessing module 210 may compare the number of active titles of a particular distribution partner received from the distribution report against a list of active titles for that particular distribution partner (e.g., retrieved from a previous agreement between the content owner and the particular distribution partner and/or provided by the content owner). If there is an inconsistency, the assessment and control system 108 may notify the content owner.

In some embodiments, the preprocessing module 210 may also retrieve and aggregate a total number of minutes streamed of content owner's content for a distribution partner from the distribution partner's distribution report and provide the total number of minute's streamed in the payments detail dashboard graphical user interface 1200 and/or for display on the dashboard graphical user interface 300.

The preprocessing module 210 may also calculate the gross revenue identified in a particular distribution report for each item of content (series and non-series) and aggregate the total revenue for the content owner's content for providing in the payments detail dashboard graphical user interface 1200 and/or for display on the dashboard graphical user interface 300. The preprocessing module 210 may also similarly provide the net revenues.

Figure 13:
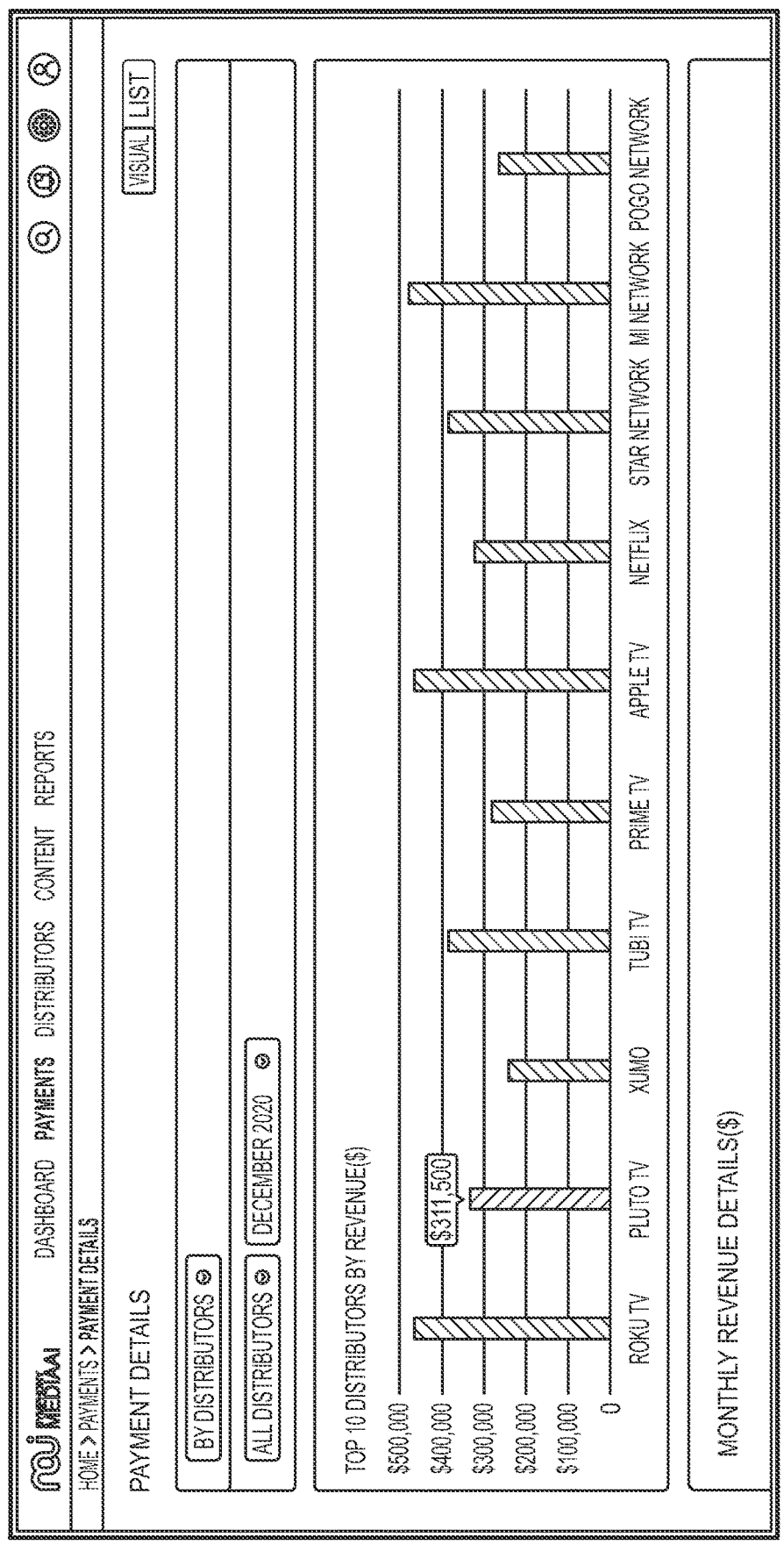
FIG. 13 depicts a visual payments detail dashboard graphical user interface in some embodiments.

FIG. 13 depicts a visual payments detail dashboard graphical user interface 1300 in some embodiments. In this example, the visual payments detail dashboard graphical user interface 1300 may be accessed through the user interacting with a "visual" link or interface on the payments detail dashboard graphical user interface 1200. The user may navigate back to payments detail dashboard graphical user interface 1200 by engaging with the "list" link or interface on the visual payments detail dashboard graphical user interface 1300.

The visual payments detail dashboard graphical user interface 1300 may provide bar charts, line charts, pie charts, and/or other graphics depicting the revenue of different distribution partners for the content owner. In this example, any number of distribution partners (e.g., the top ten distribution partners by revenue or payment to the content owner) of a particular content owner may be depicted and a bar graph may indicate the total revenue for a period of time (e.g., December 2020). It will be appreciated that all distribution partners or any number of distribution partner may be listed in the graphs/charts including their revenues for the content owner. Further, it will be appreciated that the user may change the time period (e.g., a particular month, date, year, week, date range, or the like) and automatically receive a graph of revenues for the listed distribution partners for the content owner during the selected time period.

In various embodiments, as discussed herein, the assessment and control system 108 may receive distribution reports from each of the distribution partners and then retrieve and process information based on the revenue and/or performance rules between the distribution partner and the content owner. The preprocessing module 210 may count the number of active titles (series and non-series) identified in a distribution report. In some embodiments, the preprocessing module 210 may compare the number of active titles of a particular distribution partner received from the distribution report against a list of active titles for that particular distribution partner (e.g., retrieved from a previous agreement between the content owner and the particular distribution partner and/or provided by the content owner). If there is an inconsistency, the assessment and control system 108 may notify the content owner.

FIG. 14 depicts a report dashboard graphical user interface 1400 in some embodiments. In this example, the report dashboard graphical user interface 1400 may be accessed through the user interacting with a report link or interface on the dashboard graphical user interface 300. The report dashboard graphical user interface 1400 may enable the user to review revenue metrics and performance metrics for any number of distributors based on distribution reports.

The report dashboard graphical user interface 1400 may enable the user to identify a time period (e.g., a particular date, range of dates, any time before a date, or any time after a date). The report dashboard graphical user interface 1400 may further allow a user to identify any number of distributor(s), any number of series (e.g., episodes and/or series of episodes), and/or any number of non-serial content (e.g., identified as "titles" in report dashboard graphical user interface 1400).

Based on the identified or selected information, the assessment and control system 108 may generate a list of distribution reports related to the identified distribution partner(s), during the identified date(s), regarding the identified ser(ies) and/or non-serial content. The assessment and control system 108 may further group the distribution reports for different date ranges and aggregate revenue, subscription information, or other revenue information as well as performance information across applicable distribution reports.

In the example of FIG. 14, the report dashboard graphical user interface 1400 may list distribution reports and/or groupings of distribution reports including related start date, end date, distributor(s), ser(ies) name(s), and title name(s). The report dashboard graphical user interface 1400 may further provide revenue (e.g., payments and subscriptions), performance metrics, projected payments, projected subscription by value, per distribution report or by groups of distribution reports.

In some embodiments, the report dashboard graphical user interface 1400 may further include links to download the relevant distribution reports.

As discussed herein, there may be any number of differently formatted distribution reports. FIG. 15 depicts an example distribution report 1500 in some embodiments. The distribution report 1500 includes a marketplace field, a country region code field, an invoice ID field, a transaction identifier field, a transaction time field, a transaction type, an adjustment field, an ID1 field, a title field, an item name field, an in-app subscription term field, an in-app subscription status field, a unit field, a usage time field, a marketplace currency field, a sales price field and an estimated earnings field. While FIG. 15 depicts two tables, it will be appreciated that a distribution report may include a single table with the rows of the first table extending horizontally along the rows of the second table.

In this example, distribution report 1500 may represent a distribution report received from Amazon. The distribution report 1500 may identify the country, each individual invoice per transaction, the time of the particular transaction, and the like. Income or payments to the content owner may be based on the subscriptions to the distribution partner (e.g., AMAZON). The distribution report may further indicate the type of subscription, subscription status, sales price and earnings for the content owner.

It will be appreciated that there may be additional or fewer fields.

FIGS. 16*a* and 16*b* depict an example distribution report 1600 in some embodiments. The distribution report 1600 includes a provider field, a provider country region code field, a SKU field, a developer field, a title field, a version field, a product type identifier field, a unites field, a developer proceeds field, a begin date field, an end date field, a customer currency field, a country code field, a currency of proceeds field, a distributor identifier field, a customer price field, a promo code field, a parent identifier field, a subscription field, a period field, a category field, a CMB field, a device field, a supported platforms field, a proceeds reason field, and a preserved pricing field.

In this example, the distribution report may be for APPLE as a provider and the SKU may be for a particular streaming service supported by APPLE. The distribution report 1600 may indicate revenue based on subscription to a service that provides content owner's content. An agreement between the distribution partner and the content owner may indicate that the content owner receives a portion of proceeds or other payment from subscriptions. The distribution report 1600 may provide additional information about the type of subscriptions, the platforms, countries, and the like which may be tracked and analyzed by the assessment and control system 108 for insights and projections.

FIG. 17 depicts distribution reports 1700 and 1750 for different AVOD services in some embodiments. In these examples, rather than the content owner earning money for subscription to distribution partners that distribute the content owner's content, the content owner may earn revenue from advertising (and potential click throughs) shown before, during, or after the content owner's content. The distribution report 1700 may indicate the content partner name, the series name, the clip name, the TVms (e.g., indicating time watched content owner's content), number of sessions, and revenue per clip. The revenue per clip may be based on the total advertising revenue by showing advertising for the particular clip (e.g., the particular episode of the serial) during a particular time period.

The distribution report 1750 may indicate a date (e.g., each row being an aggregation of information for the particular date regarding the content owner's content for the particular distribution partner that provided the distribution report), the channel name, a content identifier, a content name, a device type, a country code, a session count, a total viewership, a total of unique viewers, and an average of session.

In this example, the content identifier may be associated with a title (e.g., episode of a series or non-series content) and the content name may be the name of the particular content of the content owner that is distributed by the distribution partner). The session count may be the total number of sessions on that day related to consumption of the content owner's content, total viewership indicating total viewers and unique viewers being a measure of the number of viewers that appear to be consuming the content for the first time (e.g., by a particular IP address and/or during a date range).

Figure 18:
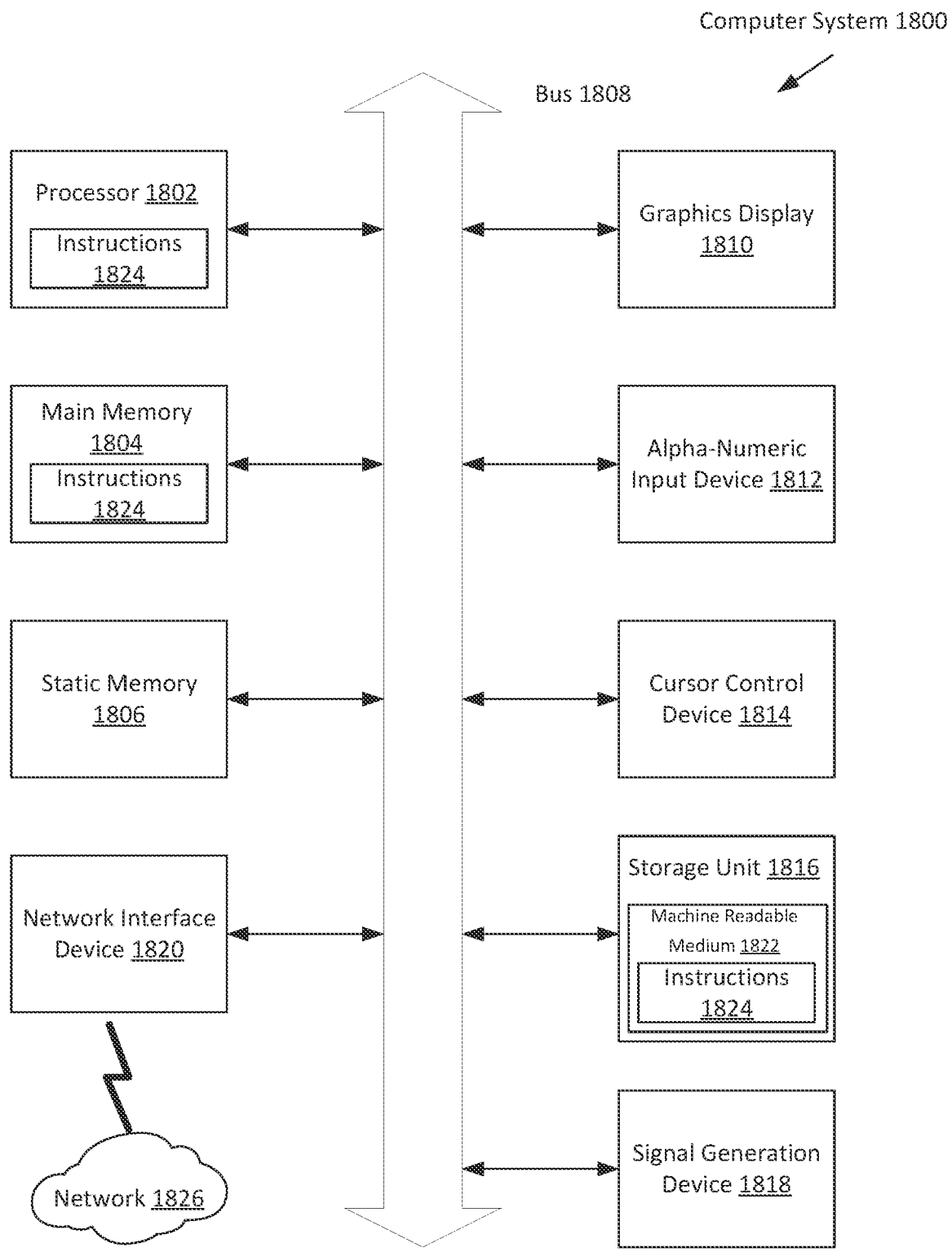
FIG. 18 is a block diagram illustrating entities of an example digital device in some embodiments.

FIG. 18 is a block diagram illustrating entities of an example digital device in some embodiments. A digital device may be any device with memory and a processor. A digital device may be a machine able to read instructions from a machine-readable medium and execute those instructions in a processor to perform the machine processing tasks discussed herein, such as the engine operations discussed above. Specifically, FIG. 18 shows a diagrammatic representation of a machine in the example form of a computer system 1800 within which instructions 1824 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web application, a network router, switch or bridge, or any machine capable of executing instructions 1824 (sequential or otherwise) that specify actions to be taken by that machine. Further, while only a single machine is illustrated, the term "machine" shall also be taken to include any collection of machines that individually or jointly execute instructions 1824 to perform any one or more of the methodologies discussed herein.

The example computer system 1800 includes a processor 1802 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 1804, and a static memory 1806, which are configured to communicate with each other via a bus 1808. The computer system 1800 may further include graphics display unit 1810 (e.g., a plasma display panel (PDP), a liquid crystal display (LCD), a projector, or a cathode ray tube (CRT)). The computer system 1800 may also include alphanumeric input device 1812 (e.g., a keyboard), a cursor control device 1814 (e.g., a mouse, a trackball, a joystick, a motion sensor, or other pointing instrument), a data store 1816, a signal generation device 1818 (e.g., a speaker), an audio input device 1826 (e.g., a microphone) and a network interface device 1820, which also are configured to communicate via the bus 1808.

The data store 1816 includes a machine-readable medium 1822 on which is stored instructions 1824 (e.g., software) embodying any one or more of the methodologies or functions described herein. The instructions 1824 (e.g., software) may also reside, completely or at least partially, within the main memory 1804 or within the processor 1802 (e.g., within a processor's cache memory) during execution thereof by the computer system 1800, the main memory 1804 and the processor 1802 also constituting machine-readable media. The instructions 1824 (e.g., software) may be transmitted or received over a network (not shown) via network interface device 1820.

While machine-readable medium 1822 is shown in an example embodiment to be a single medium, the term "machine-readable medium" should be taken to include a single medium or multiple media (e.g., a centralized or distributed database, or associated caches and servers) able to store instructions (e.g., instructions 1824). The term "machine-readable medium" shall also be taken to include any medium that is capable of storing instructions (e.g., instructions 1824) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 18.

Alternatively, hardware or software modules may be stored elsewhere within a computing system.

As referenced herein, a computer or computing system includes hardware elements used for the operations described here regardless of specific reference in FIG. 18 to such elements, including for example one or more processors, high speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
one or more processors; and
memory containing instructions configured to control the one or more processors to:
receive a first distribution report from a first distribution partner and a second distribution report from a second distribution partner, the first distribution partner providing distribution of a first content owner's content to consumers over a first OTT distribution channel, the second distribution partner providing distribution of the first content owner's content over a second OTT distribution channel, the distribution partners being independent of each other, the first distribution partner and the second distribution partner distributing at least some of a same content of the first content owner's content to different consumers, the first OTT distribution channel being different than the second OTT distribution channel, the first distribution report indicating first performance information including consumer consumption of the first content owner's content provided over the first OTT distribution channel and first revenue information related to distribution of the first content owner's content, the consumer consumption of the first distribution report indicating consumption by a plurality of different, unrelated consumers of the first content owner's content over the first OTT distribution channel, the second distribution report indicating second performance information including consumer consumption of the first content owner's content provided over the second OTT distribution channel and revenue information related to the first content owner's content, the consumer consumption of the second distribution report indicating consumption by a plurality of different, unrelated consumers of the first content owner's content over the second OTT distribution channel, the consumers of the consumer consumption of the second distribution report being different than the consumers of the consumer consumption of the first distribution report;
retrieve first revenue information from the first distribution report, the first revenue information indicating first payments from the first distribution partner to a first content owner in exchange for content distribution;
determine first payment information based on first revenue rules and the first performance information from the first distribution report, the first performance information indicating consumption of the first content owner's content using the first OTT distribution channel, the first payment information indicating payment earned by the first content owner based on the first revenue rules, the first revenue rules indicating criteria of compensation between the content owner and the first distribution partner;
notify a first content owner system of the first content owner if the first payment information does not match the first revenue information;
retrieve second revenue information from the second distribution report, the second revenue information indicating second payments from the second distribution partner to the first content owner in exchange for content distribution;
determine second payment information based on second revenue rules and the second performance information from the second distribution report, the second performance information indicating consumption of the first content owner's content using the second OTT distribution channel, the second payment information indicating payment earned by the first content owner based on the second revenue rules, the second revenue rules indicating criteria of compensation between the content owner and the second distribution partner;
notify a first content owner system of the first content owner if the second payment information does not match the second revenue information; and
provide a first graphical user interface depicting first aggregate value of each title of a plurality of titles of the first content, the aggregate value being an aggregation of the first payment information from the first distribution report and the second payment information from the second distribution report, one or more of the plurality of titles of the first content being distributed by both the first OTT distribution channel and the second OTT distribution channel, the first graphical user interface further configured to display the first payment information and the first revenue information associated with the first distribution partner, first performance information associated with the first distribution partner, the second payment information and the second revenue information associated with the second distribution partner, second performance information associated with the second distribution partner.

2. The system of claim 1, the memory containing instructions configured to control the one or more processors to further retrieve a first report template, the first report template indicating locations of the first revenue information from two or more locations within the first distribution report, wherein retrieve first revenue information from the first distribution report comprises the instructions configured to control the one or more processors to utilize the first report template to retrieve the first revenue information.

3. The system of claim 1, the memory containing instructions configured to control the one or more processors to further:
retrieve third revenue information from a third distribution report, the third revenue information indicating third payments from a third distribution partner to the first content owner in exchange for content distribution over an OTA channel;
determine third payment information based on third revenue rules and third performance information from the third distribution report, the third performance information indicating consumption of the first content owner's content using the OTA channel, the third payment information indicating payment earned by the first content owner based on the third revenue rules, the third revenue rules indicating criteria of compensation between the first content owner and the third distribution partner; and notify the first content owner system of the first content owner if the third payment information does not match the second revenue information, and wherein the first aggregate value of each title or a plurality of titles of the first content is the aggregation of the first payment information from the first distribution report, the second payment information from the second distribution report, and the third payment information from the third distribution report.

4. The system of claim 2, the memory containing instructions configured to control the one or more processors to further:

retrieve fourth revenue information from a fourth distribution report, the fourth revenue information indicating fourth payments from a fourth distribution partner to a second content owner in exchange for content distribution over a fourth OTT distribution channel by the fourth distribution partner;

determine fourth payment information based on fourth revenue rules and fourth performance information from the fourth distribution report, the fourth performance information indicating consumption of the second content owner's content using the fourth OTT distribution channel, the fourth payment information indicating payment earned by the second content owner based on the fourth revenue rules, the fourth revenue rules indicating criteria of compensation between the second content owner and the fourth distribution partner;

notify the second content owner system of the second content owner if the fourth payment information does not match the fourth revenue information; and provide a second graphical user interface for access by the second content owner to display the fourth payment information and the fourth revenue information associated with the fourth distribution partner.

5. The system of claim 4, wherein the fourth OTT distribution channel and the first OTT distribution channel utilize a distribution methodology, whereby the first report template is used to indicate locations of the fourth revenue information from two or more locations within the fourth distribution report, wherein retrieve fourth revenue information from the fourth distribution report comprises the instructions configured to control the one or more processors to utilize the first report template to retrieve the fourth revenue information.

6. The system of claim 1, wherein the first OTT distribution channel is an SVOD channel and the second OTT distribution channel is a FAST channel.

7. The system of claim 1, wherein first revenue information tracks compensation based on advertisement revenue associated with consumption of the first content and second revenue information tracks compensation based on subscription revenue.

8. The system of claim 2, the memory containing instructions configured to control the one or more processors to further perform language recognition on the first distribution report, recognize headers within the first distribution report to identify locations of metrics, and generate the first template using the locations.

9. The system of claim 1, wherein the first graphical user interface indicates historical performance and payments of the first distribution partner related to the first content compared to the historical performance and payments of the second distribution partner related to the first content.

10. A method comprising:

receiving a first distribution report from a first distribution partner and a second distribution report from a second distribution partner, the first distribution partner providing distribution of a first content owner's content to consumers over a first OTT distribution channel, the second distribution partner providing distribution of the first content owner's content over a second OTT distribution channel, the distribution partners being independent of each other, the first distribution partner and the second distribution partner distributing at least some of a same content of the first content owner's content to different consumers, the first OTT distribution channel being different than the second OTT distribution channel, the first distribution report indicating first performance information including consumer consumption of the first content owner's content provided over the first OTT distribution channel and first revenue information related to distribution of the first content owner's content, the consumer consumption of the first distribution report indicating consumption by a plurality of different, unrelated consumers of the first content owner's content over the first OTT distribution channel, the second distribution report indicating second performance information including consumer consumption of the first content owner's content provided over the second OTT distribution channel and revenue information related to the first content owner's content, the consumer consumption of the second distribution report indicating consumption by a plurality of different, unrelated consumers of the first content owner's content over the second OTT distribution channel, the consumers of the consumer consumption of the second distribution report being different than the consumers of the consumer consumption of the first distribution report;

retrieving first revenue information from the first distribution report, the first revenue information indicating first payments from the first distribution partner to a first content owner in exchange for content distribution;

determining first payment information based on first revenue rules and the first performance information from the first distribution report, the first performance information indicating consumption of the first content owner's content using the first OTT distribution channel, the first payment information indicating payment earned by the first content owner based on the first revenue rules, the first revenue rules indicating criteria of compensation between the content owner and the first distribution partner;

notifying a first content owner system of the first content owner if the first payment information does not match the first revenue information;

retrieving second revenue information from the second distribution report, the second revenue information indicating second payments from the second distribution partner to the first content owner in exchange for content distribution;

determining second payment information based on second revenue rules and the second performance information from the second distribution report, the second performance information indicating consumption of the first content owner's content using the second OTT distribution channel, the second payment information indicating payment earned by the first content owner based on the second revenue rules, the second revenue rules indicating criteria of compensation between the content owner and the second distribution partner;

notifying a first content owner system of the first content owner if the second payment information does not match the second revenue information; and providing a first graphical user interface depicting first aggregate value of each title of a plurality of titles of the first content, the aggregate value being an aggregation of the first payment information from the first distribution report and the second payment information from the second distribution report, one or more of the plurality of titles of the first content being distributed by both the first OTT distribution channel and the second OTT distribution channel, the first graphical user interface further configured to display the first payment information and the first revenue information associated with the first distribution partner, first performance information associated with the first distribution partner, the second payment information and the second revenue information associated with the second distribution partner, second performance information associated with the second distribution partner.

11. The method of claim 10, further comprising retrieving a first report template, the first report template indicating locations of the first revenue information from two or more locations within the first distribution report, wherein retrieving first revenue information from the first distribution report comprises utilizing the first report template to retrieve the first revenue information.

12. The method of claim 10, further comprising:
retrieving third revenue information from a third distribution report, the third revenue information indicating third payments from a third distribution partner to the first content owner in exchange for content distribution over an OTA channel;
determining third payment information based on third revenue rules and third performance information from the third distribution report, the third performance information indicating consumption of the first content owner's content using the OTA channel, the third payment information indicating payment earned by the first content owner based on the third revenue rules, the third revenue rules indicating criteria of compensation between the first content owner and the third distribution partner; and
notifying the first content owner system of the first content owner if the third payment information does not match the second revenue information, and wherein the first aggregate value of each title or a plurality of titles of the first content is the aggregation of the first payment information from the first distribution report, the second payment information from the second distribution report, and the third payment information from the third distribution report.

13. The method of claim 10, further comprising:
retrieving fourth revenue information from a fourth distribution report, the fourth revenue information indicating fourth payments from a fourth distribution partner to a second content owner in exchange for content distribution over a fourth OTT distribution channel by the fourth distribution partner;
determining fourth payment information based on fourth revenue rules and fourth performance information from the fourth distribution report, the fourth performance information indicating consumption of the second content owner's content using the fourth OTT distribution channel, the fourth payment information indicating payment earned by the second content owner based on the fourth revenue rules, the fourth revenue rules indicating criteria of compensation between the second content owner and the fourth distribution partner;
notifying the second content owner system of the second content owner if the fourth payment information does not match the fourth revenue information; and
providing a second graphical user interface for access by the second content owner to display the fourth payment information and the fourth revenue information associated with the fourth distribution partner.

14. The method of claim 13, further comprising wherein the fourth OTT distribution channel and the first OTT distribution channel utilize a distribution methodology, whereby a first report template is used to indicate locations of the fourth revenue information from two or more locations within the fourth distribution report, wherein retrieving fourth revenue information from the fourth distribution report comprises utilizing the first report template to retrieve the fourth revenue information.

15. The method of claim 10, wherein the first OTT distribution channel is an SVOD channel and the second OTT distribution channel is a FAST channel.

16. The method of claim 10, further comprising, wherein first revenue information tracks compensation based on advertisement revenue associated with consumption of the first content and second revenue information tracks compensation based on subscription revenue.

17. The method of claim 11, further comprising performing language recognition on the first distribution report, recognize headers within the first distribution report to identify locations of metrics, and generate the first template using the locations.

18. The method of claim 10, wherein the first graphical user interface indicates historical performance and payments of the first distribution partner related to the first content compared to the historical performance and payments of the second distribution partner related to the first content.

19. A computer program product comprising a non-transitory computer readable storage medium having a program code embodied therewith, the program code executable by a computing system to cause the computing system to perform:
receiving a first distribution report from a first distribution partner and a second distribution report from a second distribution partner, the first distribution partner providing distribution of a first content owner's content to consumers over a first OTT distribution channel, the second distribution partner providing distribution of the first content owner's content over a second OTT distribution channel, the distribution partners being independent of each other, the first distribution partner and the second distribution partner distributing at least some of a same content of the first content owner's content to different consumers, the first OTT distribution channel being different than the second OTT distribution channel, the first distribution report indicating first performance information including consumer consumption of the first content owner's content provided over the first OTT distribution channel and first revenue information related to distribution of the first content owner's content, the consumer consumption of the first distribution report indicating consumption by a plurality of different, unrelated consumers of the first content owner's content over the first OTT distribution channel, the second distribution report indicating second performance information including consumer consumption of the first content owner's content provided over the second OTT distribution channel and revenue information related to the first content owner's content, the consumer consumption of the second distribution report indicating consumption by a plurality of different, unrelated consumers of the first content owner's content over the second OTT distribution channel, the consumers of the consumer consumption of the second distribution report being different than the consumers of the consumer consumption of the first distribution report;

retrieving first revenue information from the first distribution report, the first revenue information indicating first payments from the first distribution partner to a first content owner in exchange for content distribution;

determining first payment information based on first revenue rules and the first performance information from the first distribution report, the first performance information indicating consumption of the first content owner's content using the first OTT distribution channel, the first payment information indicating payment earned by the first content owner based on the first revenue rules, the first revenue rules indicating criteria of compensation between the content owner and the first distribution partner;

notifying a first content owner system of the first content owner if the first payment information does not match the first revenue information;

retrieving second revenue information from the second distribution report, the second revenue information indicating second payments from the second distribution partner to the first content owner in exchange for content distribution;

determining second payment information based on second revenue rules and the second performance information from the second distribution report, the second performance information indicating consumption of the first content owner's content using the second OTT distribution channel, the second payment information indicating payment earned by the first content owner based on the second revenue rules, the second revenue rules indicating criteria of compensation between the content owner and the second distribution partner;

notifying a first content owner system of the first content owner if the second payment information does not match the second revenue information; and providing a first graphical user interface depicting first aggregate value of each title of a plurality of titles of the first content, the aggregate value being an aggregation of the first payment information from the first distribution report and the second payment information from the second distribution report, one or more of the plurality of titles of the first content being distributed by both the first OTT distribution channel and the second OTT distribution channel, the first graphical user interface further configured to display the first payment information and the first revenue information associated with the first distribution partner, first performance information associated with the first distribution partner, the second payment information and the second revenue information associated with the second distribution partner, second performance information associated with the second distribution partner.

* * * * *